United States Patent [19]

Hibino et al.

[11] Patent Number: 5,599,231

[45] Date of Patent: Feb. 4, 1997

[54] SECURITY SYSTEMS AND METHODS FOR A VIDEOGRAPHICS AND AUTHENTICATION GAME/PROGRAM FABRICATING DEVICE

[75] Inventors: Toshiro Hibino; Satoshi Yamato, both of Kyoto-fu, Japan

[73] Assignee: Nintendo Co., Ltd., Kyoto, Japan

[21] Appl. No.: 332,812

[22] Filed: Oct. 31, 1994

[51] Int. Cl.⁶ ...................................................... A63F 9/00
[52] U.S. Cl. ........................... 463/29; 463/46; 463/47
[58] Field of Search ......................... 273/434, 435, 273/437, 460, 148 B; 364/410; 380/4

[56] References Cited

U.S. PATENT DOCUMENTS

| | | | |
|---|---|---|---|
| Re. 34,161 | 1/1993 | Nakagawa et al. | 273/148 B |
| 3,827,029 | 7/1974 | Schlotterer et al. | 380/4 |
| 4,525,599 | 6/1985 | Curran et al. | 273/460 |
| 4,597,058 | 6/1986 | Izumi et al. | 380/4 |
| 4,652,990 | 3/1987 | Pailen et al. | 380/4 |
| 4,799,635 | 1/1989 | Nakagawa | 380/4 |
| 4,841,291 | 6/1989 | Swix et al. . | |
| 4,959,861 | 9/1990 | Howlette | 380/4 |
| 5,004,232 | 4/1991 | Wong et al. | 273/435 |
| 5,016,876 | 5/1991 | Loffredo . | |
| 5,081,676 | 1/1992 | Chou et al. | 380/4 |
| 5,107,443 | 4/1992 | Smith et al. . | |
| 5,111,409 | 5/1992 | Gasper et al. . | |
| 5,112,051 | 5/1992 | Darling et al. . | |
| 5,254,984 | 10/1993 | Wakeland . | |
| 5,282,247 | 1/1994 | McLean et al. | 380/4 |
| 5,307,456 | 4/1994 | MacKay . | |
| 5,324,035 | 6/1994 | Morris et al. . | |
| 5,331,417 | 7/1994 | Soohoo . | |
| 5,337,357 | 8/1994 | Chou et al. | 380/4 |
| 5,357,604 | 10/1994 | San et al. . | |
| 5,388,841 | 2/1995 | San et al. . | |
| 5,428,685 | 7/1995 | Kadooka et al. | 380/4 |
| 5,437,464 | 8/1995 | Terasima | 273/434 |

OTHER PUBLICATIONS

Microsoft Press Computer Dictionary, 2nd Edition, p. 205 (1993).

Microsoft Windows User's Guide, Version 3.1, pp. 73–75 (1991).

May, "Great Game Add–Ins", Compute, vol. 15, n. 10, p. 92(4), Oct. 1993.

Simon, "Windows Shareware", Windows Sources, vol. 1, n. 4, p. 79(2), May 1993.

Primary Examiner—Jessica Harrison
Assistant Examiner—James Schaaf
Attorney, Agent, or Firm—Nixon & Vanderhye PC

[57] ABSTRACT

A videographics/video game fabricating system includes a multiprocessor based game processor console which includes a main central processing unit (CPU) which controls editing operations and operating system task execution and a game CPU for executing the model video game which is loaded into a pluggable RAM cartridge. The model video game provides a starting point from which a user can readily create an original video game including desired aspects of the model software. The system includes security features to prevent unauthorized use and copying of proprietary data and program software files. The security features include a unique ID card for insertion into the system console having stored ID DATA corresponding to matching ID DATA associated with certain files stored on floppy disks. In addition, the ID card and a game cartridge may include customized security circuits that authenticate one another.

28 Claims, 17 Drawing Sheets

SECURITY SYSTEMS AND METHODS FOR A VIDEOGRAPHICS AND AUTHENTICATION GAME/PROGRAM FABRICATING DEVICE

RELATED APPLICATIONS

This application is related to the following commonly-owned applications which are contemporaneously filed with this application and which applications are expressly incorporated by reference:

"Videographic Program/Video Game Fabricating System and Method", inventors: S. Yamato et al (Attny. ref. 723–298);

"Video Game/Videographics Program Fabricating System and Method with Superimpose Control", inventors: S. Yamato et al (Attny. ref. 723–302);

"Video Game/Videographics Program Fabricating System And Method With Unit Based Program Processing" (Attny. ref. 723–303), and "Video Game/Videographics Program Editing Apparatus With Program Halt and Data Transfer Features", inventors: S. Yamato et al (Attny. ref. 723–305).

FIELD OF THE INVENTION

This invention relates generally to a method and apparatus for preventing unauthorized users from copying programs and data using a unique videographics computer system. The present invention relates to a security system embedded in a video game fabricating system designed primarily for users who are unfamiliar with computer programs or video game creating methodology. Such users may insert a personal identification card that authorizes the user to activate an interactive game processor computing system that permits a video game to be executed, stopped, edited and resumed from the point where the editing began with the editorial changes persisting throughout the remainder of game play.

BACKGROUND AND SUMMARY OF THE INVENTION

Current-day dedicated home or commercial video game devices do not permit users to copy the video games and thereby protect the valuable copyrights and other proprietary rights that manufacturers and video game publishers own in their video games. Wide spread unauthorized copying of video games is believed to have substantially contributed to the crash of the home video game industry in the United States in the early 1980's and, even today, seriously dilutes the sales of video games in many countries. Home video game console manufacturers since the early 1980s have incorporated security measures to prevent easy copying of home video games and the use of unlicensed video games, especially home video game cartridges. An example of a home video game security system is described in U.S. Pat. No. 4,799,635, assigned to Nintendo Co. Ltd. and used in conjunction with the Nintendo Entertainment System (NES) and the Super Nintendo Entertainment System (SNES).

In the prior art, a rudimentary attempt has been made to permit a user to modify, in limited respects, the intended manner in which a video game program operates. In this product, a game changing device is physically inserted into a conventional video game cartridge which in turn is coupled to a microprocessor based video game console. The game changing device includes a read-only memory (ROM) storing codes likely to be changed during the course of a game. The device monitors the video game microprocessor's address and data bus and transmits to the microprocessor a replacement code if there is a match with expected values. The replacement code modifies game play characteristics such as the number of lives of a character, the number of missiles which may be fired, etc. The user has no control over a game editing process with this product and has no ability to radically change game play in the manner that is practically realizable in accordance with the present invention. Moreover, game play can only be changed to permit operations and graphic displays originally contemplated within the realm of possible operations by the game programmer. However, in this prior art device, video games cannot be copied and thus the device does not permit an unauthorized user to make illegal copies of a video game.

Professional video game designers have heretofore had access to game program authoring tools to aid in designing original video games. These authoring tools do permit a professional designer to copy video games. However, these authoring tools are not widely available to general game player users and are generally too complicated for typical game player users to use. Accordingly, general game player users do not often copy illegally video games using these professional authoring tools.

In such programming authoring systems, considerable program designer activity is often required to modify a game under development in even very simple respects. For example, changes that are made to characters in a game are typically first made in an original character array, specified by the artist who formulated the character images. Any change made to characters must then be saved as a new file and transferred to, for example, a program debugging module which introduces the change into the game program under development. Changing the graphics of a game under development even with respect to relatively simple modifications typically involves a complex process of recompiling, reloading and displaying the modification. While a wide variety of sophisticated changes may be made to a game program being authored under the control of conventional authoring programs, such modifications require a high degree of programming sophistication and knowledge of game programming techniques.

In accordance with the present invention, unique video games may be simply created by authorized users ranging from a relatively unsophisticated elementary school students to sophisticated game developers. A unique hardware and software platform enables authorized users to create and copy original games by selecting icons which access more detailed editor screens permitting the user to directly change a wide variety of game display characteristics concerning moving objects and game backgrounds. In addition, a unique authorization system using user identification cards restricts access to the hardware and software platform to prevent unauthorized access and copying of video games and video game software.

Model software containing a model game from a desired genre of games is loaded into a video game RAM cassette and operating system software is loaded into a system RAM via a floppy disk. The present invention permits the user to initiate model game play, stop the game at any desired game screen to initiate a "system break" editing session during which a system window for enabling control over a wide variety of editing features is superimposed on the game screen. The user then selects a moving object or background scene for modification. If, for example, the user selects a moving object, then the moving object selected is identified by a unit number which is associated with a wide range of game play related characteristics. Once the moving object is selected, further icons are displayed permitting the user to completely change the object's character dot pattern for one or more of the poses associated with the object, animation features related to the object, the responses associated with detected game play conditions associated with the object, the collection of statuses associated with each object, the pattern of the object's movement, the sound associated with the pattern of the objects movement and a wide variety of additional game play related characteristics. The screen background may be likewise modified by accessing a stage window permitting the entire background map, the music associated with the background and a wide variety of additional background related features to be edited.

The exemplary embodiment of the present invention uses a multiprocessor based game processor console which includes a main central processing unit (CPU) controlling editing operations and operating system task execution and a game CPU for executing the model video game that is loaded into a pluggable RAM cartridge. The model video game provides a starting point from which a user can readily create an original video game using desired aspects of the model game. The model video game can be readily modified by user-created data to such an extent it appears to be a completely new game. The system permits a user to modify any of the game's moving objects, background screens, music or sound effects.

The main CPU and game CPU cooperate in the game execution and editorial process such that an editing screen generated by the main CPU is superimposed on a game screen generated by the program executing CPU. The game processing console includes ports connected to a wide variety of peripheral devices including a standard television set, keyboard, game hand controllers, mouse, modem board, an interface board for coupling the game processor to a personal computer system, floppy disk drive, an external RAM game cartridge and a user's ID card.

The system employs a dual security system in that a personal identification card (ID card) and a game cartridge both have embedded security custom integrated circuits (CICs) that work in cooperation with the model game software or user created software to permit game play and/or game authoring. The ID card is a personalized card having a CIC and a memory storing a unique identification data corresponding to a single authorized user and user configuration data (config.sys), such as mouse speed, mouse button double click interval, interval for keyboard key repeat and English/Japanese mode, for the operating system executed by the main CPU. The identification data in the ID card is compared by the main CPU to identification data stored on the floppy-disk containing the model game software program. If the comparison of identification data shows that the ID card corresponds to the floppy-disk, then the main CPU allows the user to activate, e.g., log-on, the personal computer functions (main CPU) of the game processor. To actually play a video game requires that the video game portion of the game processor (game CPU) be activated by confirming that an authorized game cartridge is inserted in the console.

The game cartridge also includes a security circuit, e.g. custom integrated circuit (CIC), that executes an authentication program in cooperation with a similar CIC included in the console. Such CICs and authentication techniques are described in U.S. Pat. No. 4,799,655. Assuming that the game CPU authenticates the game cartridge, then the game CPU permits the user to play video games. When an authorized cartridge, and an ID card with a corresponding floppy disk are all inserted in the game processor console, the console becomes fully activated and permits the authorized user to play, edit and create video games.

Once this authorized user creates edited games, then the cartridge loaded with the edited games may be played by any user having the cartridge and either a game processor or other compatible video game console, such as the SNES video game console. The other user may not edit the already-edited game, however. The dual ID card and cartridge authentication system sets up different levels of access to the game processor console and video game software such that any user with an authentic game cartridge may play the game on that cartridge but only one or a limited group of users with an appropriate ID card and the game software stored on a corresponding floppy disk may copy or edit the game.

These and other objects, features, aspects and advantages of the present invention will become more apparent from the following detailed description of the illustrative embodiment of the present invention, when taken in conjunction with the accompanying drawings.

DETAILED DESCRIPTION OF THE DRAWINGS

Figure 1A:
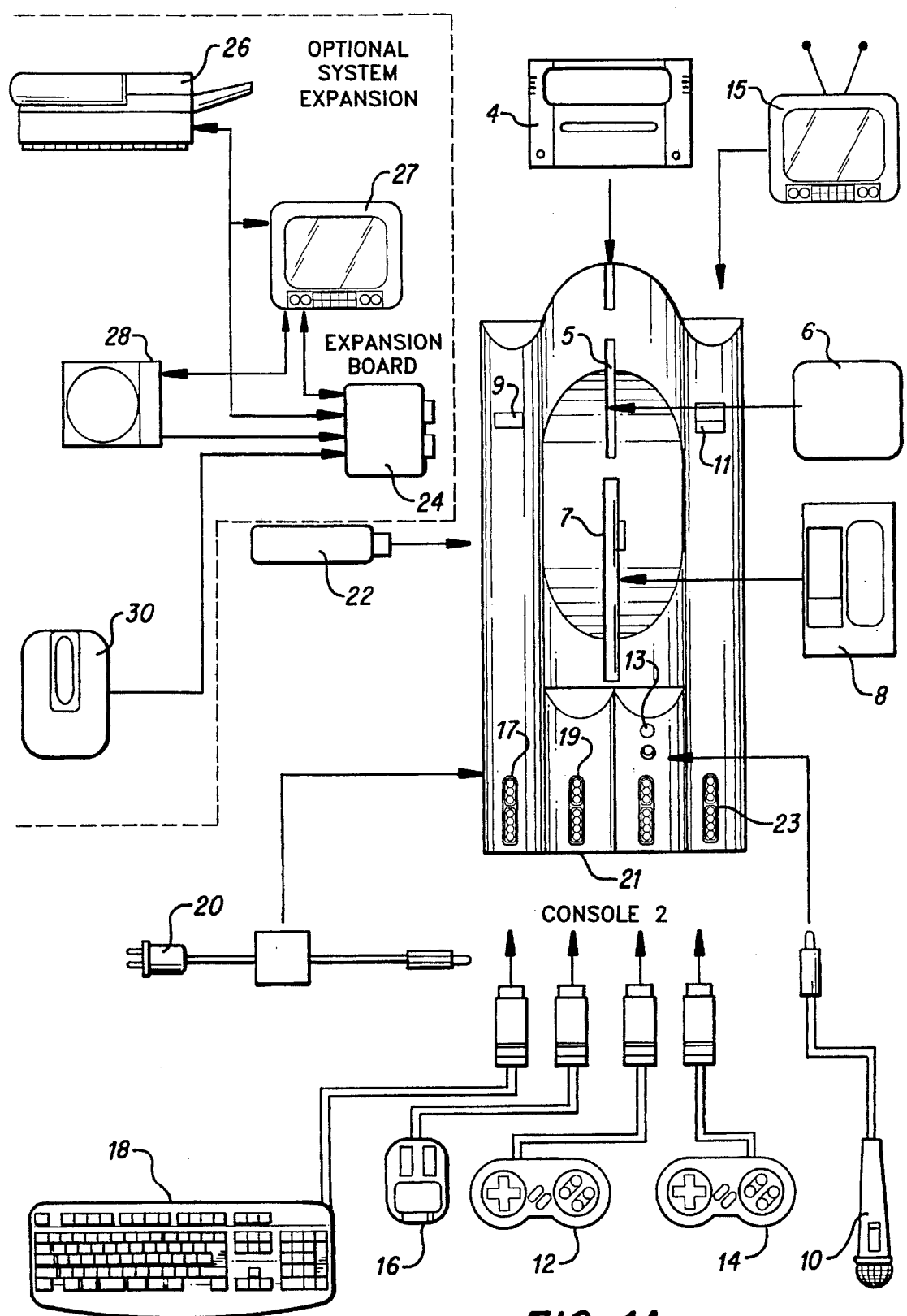
FIG. 1A is a block diagram of a videographics game fabricating system.

FIG. 1A is a general block diagram of a videographics/ video game program fabricating system in accordance with an exemplary embodiment of the present invention showing the game processor system unit console 2 and many of the associated input/output devices. The game processor system unit console 2 includes a floppy disk drive and connection port 7 (which is shown in more detail in FIGS. 1B and 1C)

for receiving, for example, a 3.5 inch floppy disk 8. Floppy disk 8 stores "model software" including model game and operating system software and user data including data regarding user created games derived from the model game software. The operating system software, which is described in more detail below, controls the overall operation of the game processor system including controlling the transfer of game program related information to a memory in RAM cassette 4 out of which a game program is executed. The model software embodied on the floppy disk 8 includes basic game program software which assists the user in game making and which the user modifies in fabricating a new game from a model game genre of video games which may be generated, e.g., "shoot-em-up games", "role-playing games", "educational games", "simulation games", etc. The floppy disk 8 may additionally contain system configuration data which is checked at boot-up to determine whether the system is in the proper configuration. In addition, the floppy disk 8 may include identification data that is unique to the specific user authorized to copy the model software stored on the floppy disk.

Files are typically organized containing a 64-byte header file which includes such fields such as file name, date, file size, file attribute, ID code, password, etc. The file author is recorded only in the base file and the purchaser's ID code is recorded at the time of purchase. The file attribute field includes bits which enable a file only if an ID code matches an author code or, alternatively, enables a file only if there is a password match. Depending upon the state of the file attribute field or other bits, it is therefore possible to enable or disable a file based on whether certain security checks are passed. The file attribute information may set various conditions for base file access such as if access is made by the purchaser, writing is disabled, if not made by the purchaser, reading and writing are disabled and the file name is not displayed. The operating system includes basic file access commands (such as load, save, verify, copy, etc.), file management commands, network commands, password commands and RAM cartridge commands. The system uses a password command which sets a password as a configuration variable. It is compared against the password in the header file. If the configuration variable has not been set, it is considered as having no password.

An example of a file structure that might be stored on the floppy disk for use in the game processor system is set forth in Table I below:

TABLE I

| FILE TYPE | ID DATA | DATA/PROGRAM |
| --- | --- | --- |

Exemplary file types may include an operating system, (designated by for example "0000" in the "File Type" field), application software (designated by for example "0001"), model game program software ("1000") and user data ("1001"). The ID DATA field may be used to specify an identification data corresponding to the data/program and such identification data may be used in conjunction with an authentication program that limits access to the data/program only to users having an ID card that contains ID DATA matching the ID DATA stored on the floppy disk. Examples of ID DATA stored on the floppy disk include: normal ID data associated with a model game program and corresponds to the unique user ID DATA stored on one ID Card (such data may be in the form of "0000 XXXX XXXX" where 0000 designates the ID DATA as being normal ID Data and XXXX XXXX is the particular identification data or password unique to the authorized user), new file data (e.g., 0001 XXXX XXXX) and a free ID (such as "1111 XXXX XXXX"). A new file data might correspond to a supplemental identification data for a file just purchased from the market, and, thus, does not yet have the user ID stored with the model program code. For newly-purchased model game files (without a user ID), the new file data is overwritten with the user ID DATA when the new file is first loaded into the user's console. A newly-purchased game (with a new file data) cannot be read until the user ID is written over the new file data. Since the new model game file then has the user ID DATA the file cannot be read, edited or used to create a user game program until the appropriate user ID DATA is invoked. Similarly, a file of a new user game program created by user includes the user ID DATA. In this way, the proprietary rights, including copyrights, of the model game creator, e.g., manufacturer, and the new game creator, e.g., user, are protected by the user ID DATA that is required for copying and editing the model software and any new games created by the user.

The identification card and authorized game cartridge afford a potential user of the game processor system various levels of access to the system. A user with an authorized ID card, model game program and authentic cartridge may have rights to copy, edit and play games. A user with just an authentic cartridge, but not an ID card, may be able to play games, but not copy or edit games. A user with an ID card, but no game cartridge, may edit and copy games but not play them. Table II below summarizes the various levels of access that the game processor system provides:

TABLE II

| ID CARD | AUTHORIZED CARTRIDGE | MODE OF OPERATION |
| --- | --- | --- |
| YES | YES | Game editing and game play |
| YES | NO | Game editing |
| NO | YES | Game play |
| NO | NO | Inactive |

At any time after the initial transfer of data/program information from floppy disk 8 to a program RAM in RAM cassette 4, RAM cassette may be removed from the game processor system unit console 2 and utilized in conjunction with a conventional video game system such as, by way of example only, the video game system commercially sold by the applicants' assignee as the Super Nintendo Entertainment System (SNES). As will be explained further below, the RAM cassette 4 also includes a security processor of the type shown in applicants' assignee's U.S. Pat. No. 4,799, 635. Similarly, the game processor system may be operated without insertion of an ID card and/or floppy disk as a conventional video game system by inserting an authorized game cartridge 4 into the cartridge connector 185.

The game processor system console unit 2 includes an insertion port 5 for a game processor ID card 6. In an exemplary embodiment of the present invention, the ID card includes a security integrated circuit and/or authentication code which is compared against identification data stored at a predetermined location on floppy disk 8. The authentication code stored in the ID card functions as a key to the application, model program and new file software stored on a corresponding floppy disk. The authentication code may include the ID DATA loaded by the model game program publisher and provided to the user with a floppy disk having the model game program. In addition, the ID card authentication program may include a new file ID DATA stored by the user in connection with new file data stored on a floppy disk that is used in conjunction with a model game program to edit and copy a new game created by that user.

If the comparison of authentication codes in the ID Card and ID DATA on the floppy disk results in a determination of authenticity, then data and programs from the floppy disk 8 may be successfully transferred to RAM cassette 4. Although floppy disk 8 contents may be copied to cassettes and other floppy disks, the user is only issued one ID card 6 to thereby provide a measure of security against counterfeiters. The ID card 6 may also contain the user's photograph and/or other identification data, such as identification data. In addition, the ID card may contain user configuration information, such as data regarding mouse speed, mouse button double click interval, interval for repeating keyboard button inputs, and English/Japanese mode, that can be used to set the operating system, such as the config.sys file, for the user authorized by the ID card.

The game processor system console unit 2 shown in FIG. 1A is designed to be coupled to a wide variety of input/output devices. It includes a jack for microphone 10 connection to enable the input of sound signals that may be used during game play. Additionally, the game processor system console 2 includes at least two player controllers 12 and 14, which may be of the type described in U.S. Pat. No. 5,207,426. These controllers are utilized to control video game play on a user's television screen by controlling moving object character movement and associated special effects in, for example, the manner typically utilized in commercial available SNES controllers described in the above-identified patent.

The game processor system console 2 additionally includes ports for connecting a conventional mouse 16 and PC compatible keyboard 18. The mouse 16 and keyboard 18 are utilized in a manner which will be described in detail below by the user as graphic/user interfaces during the video game design process. The mouse 16 permits a user such as an elementary school child who is totally unfamiliar with game programming techniques to create a unique video game through the use of the icon driven system described herein. The keyboard 18 permits game modification through input, for example, of game software instructions by more sophisticated users such as game programmers.

The game processor system unit console 2 also includes a connection port for a modem board 22. By way of example only modem 22 is a 9600 baud, half-duplex modem. The modem 22 permits the game processor system to be used in an on-line network described below. The system also includes an A/C adaptor 20 for providing power to the system.

The game processor system unit console, as will be described further below, includes two central processing units. One is primarily responsible for video game play control and a second is primarily responsible for game editing related tasks and for executing the operating system program for controlling the transfer of information from the game processor disk 8 to RAM cassette 4.

The system components shown in FIG. 1A and described above permit a user who is totally unfamiliar with video game program development to create a wide range of video games using model software stored on floppy disk 8. Through the use of the optional components identified in FIG. 1A, the system may be expanded to more readily permit professional game program designers to create video games in a unique emulation system. In this alternative embodiment, the game processor system includes an expansion board 24 which couples further I/O and other components to, for example, the operating system CPU within console 2. As shown in FIG. 1A, various additional I/O components may be coupled to the system such as a scanner 30, hard disk drive 28 or printer 26. Scanner 30 may be a conventional optical scanner and is utilized to scan a graphical image, digitize the image for storage in the game processor system unit's console memory system for use in a video game being designed. A user would then be able to access the stored image, add colors and modify the image. An SCSI interface may be embodied on expansion board 24 to permit coupling to an IBM compatible PC 27.

Figure 1B:
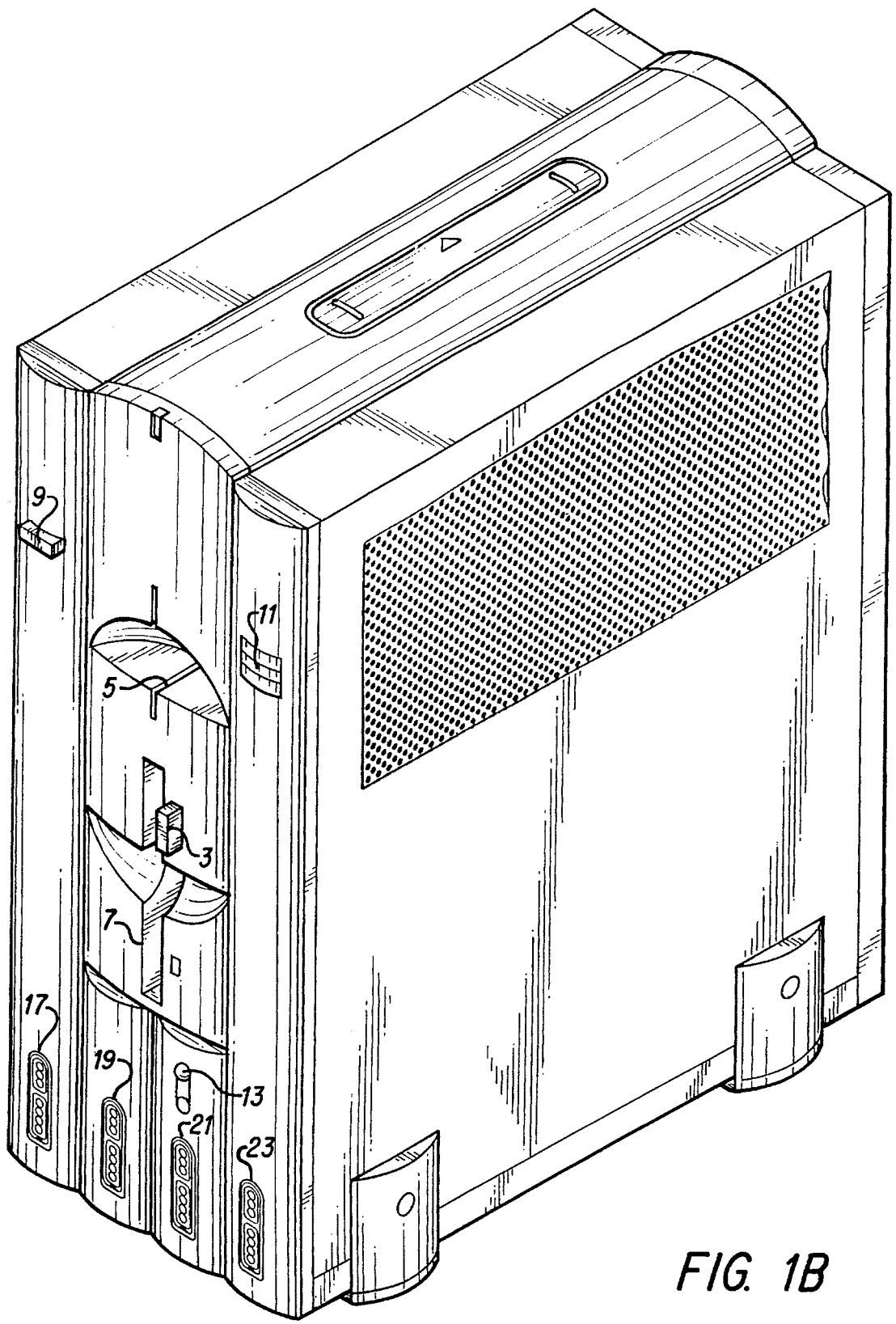
FIG. 1B is a perspective view of the game processor system console unit 2 shown in FIG. 1A.

FIG. 1B is a perspective view of the game processor system console unit 2. The console 2 includes a power ON/OFF switch 11 and a reset button 9. The reset switch 9 permits resetting the entire system including the operating system executing CPU and the game CPU. The reset button 9 in addition to placing the game program executing CPU at a known initial state also serves to interrupt the operating system CPU to permit, for example, testing operations to be performed. As shown in FIGS. 1A and 1B receptacles 5 and 7 are slots for receiving the game processor ID card 6 and the floppy disk 8, respectively. Both receptacles 5 and 7 have associated recessed areas to permit a user to easily grab and extract the respective ID card 6 or floppy disk 8. As shown in FIG. 1B, the console unit also includes a floppy disk eject button 3. Additionally, as shown in FIGS. 1A and 1B, connectors 13, 17, 19, 21 and 23 are exposed to permit ready connection of microphone 10, keyboard 18, mouse 16, controller 12 and controller 14, respectively.

Figure 1C:
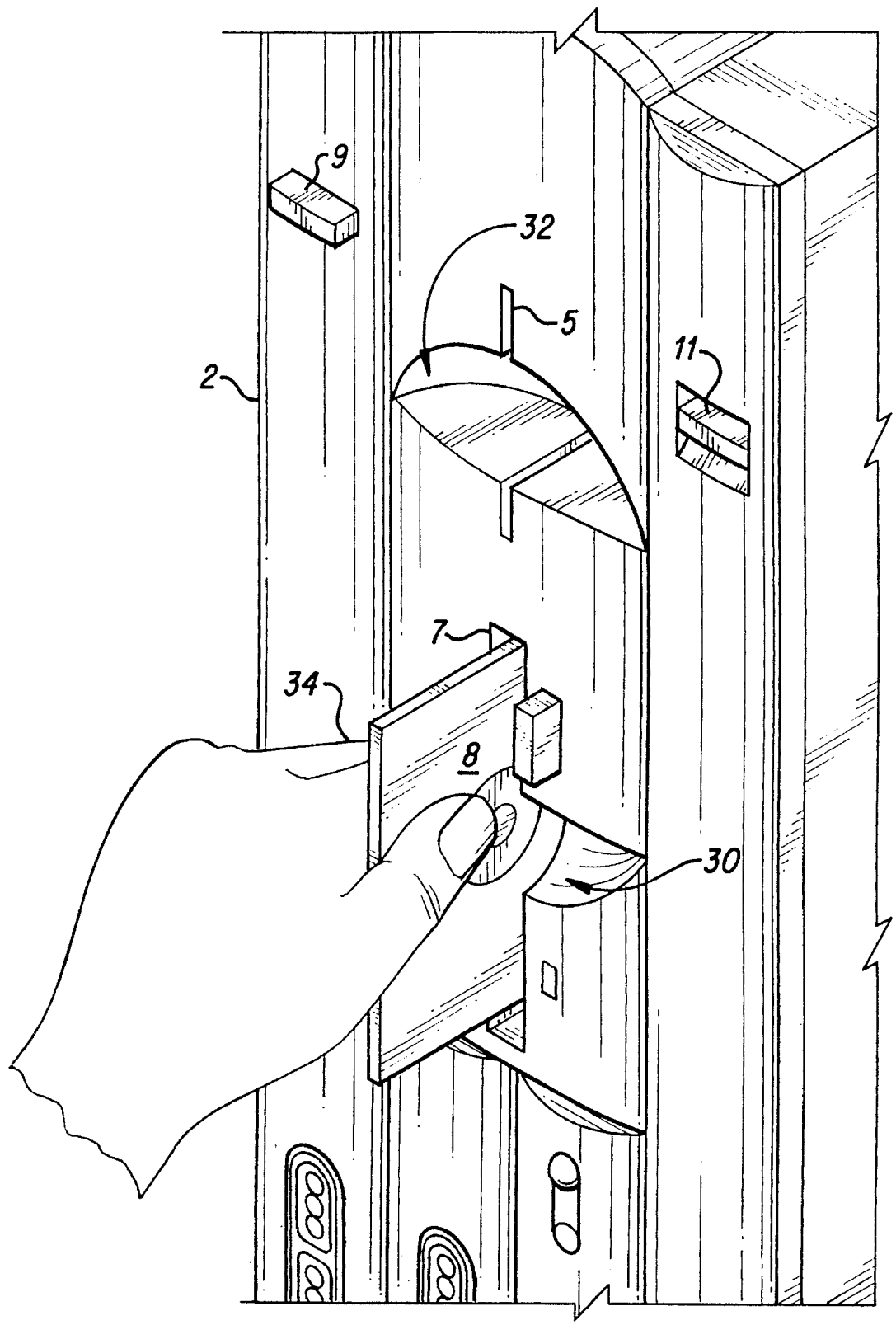
FIG. 1C is an enlarged perspective view of a portion of the game processor console unit shown in FIG. 1B.

FIG. 1C is a perspective view of the game processor showing in detail an recessed inlet 30 for the floppy disk drive slot 7 and a similar recessed inlet 32 for the insert port 5 for the ID card. The recesses are arranged to allow entry of a user's fingers 34 so that the floppy disk and ID card may be manually grasped and extracted from the console 2. In conventional personal computers, a floppy disk when fully inserted does not protrude from the floppy disk drive. Only when the floppy disk is just inserted half-way into a floppy disk drive does a portion of the disk protrude from the console. Some user's leave a floppy disk only halfway inserted in a conventional floppy disk drive. This half-way insertion poses a danger at home and to inexperienced users because the protruding floppy disk can catch on a pant leg or other article of clothing, or be hit by a falling object. In the present invention, the recesses 32 for the floppy may be sufficiently deep so that the floppy disk does not protrude from the console, even when the disk is just half-way inserted. By forming recesses on the front face of the console around the slots for the floppy disk drive and ID card insertion slot, sufficient portions of a floppy disk and ID card are reachable by a user's fingers such that the disk and card may be securely grasped by hand and extracted from the console. In the exemplary embodiment shown in FIGS. 1A to 1C, the recesses for the floppy disk drive and ID card insertion slot are quarter-spheres. This shape is both practical and eye-pleasing. Of course, the recesses may be given some other shape that permits the disk and ID card to be grasped, when inserted (fully or just half-way) into the console.

Figure 2:
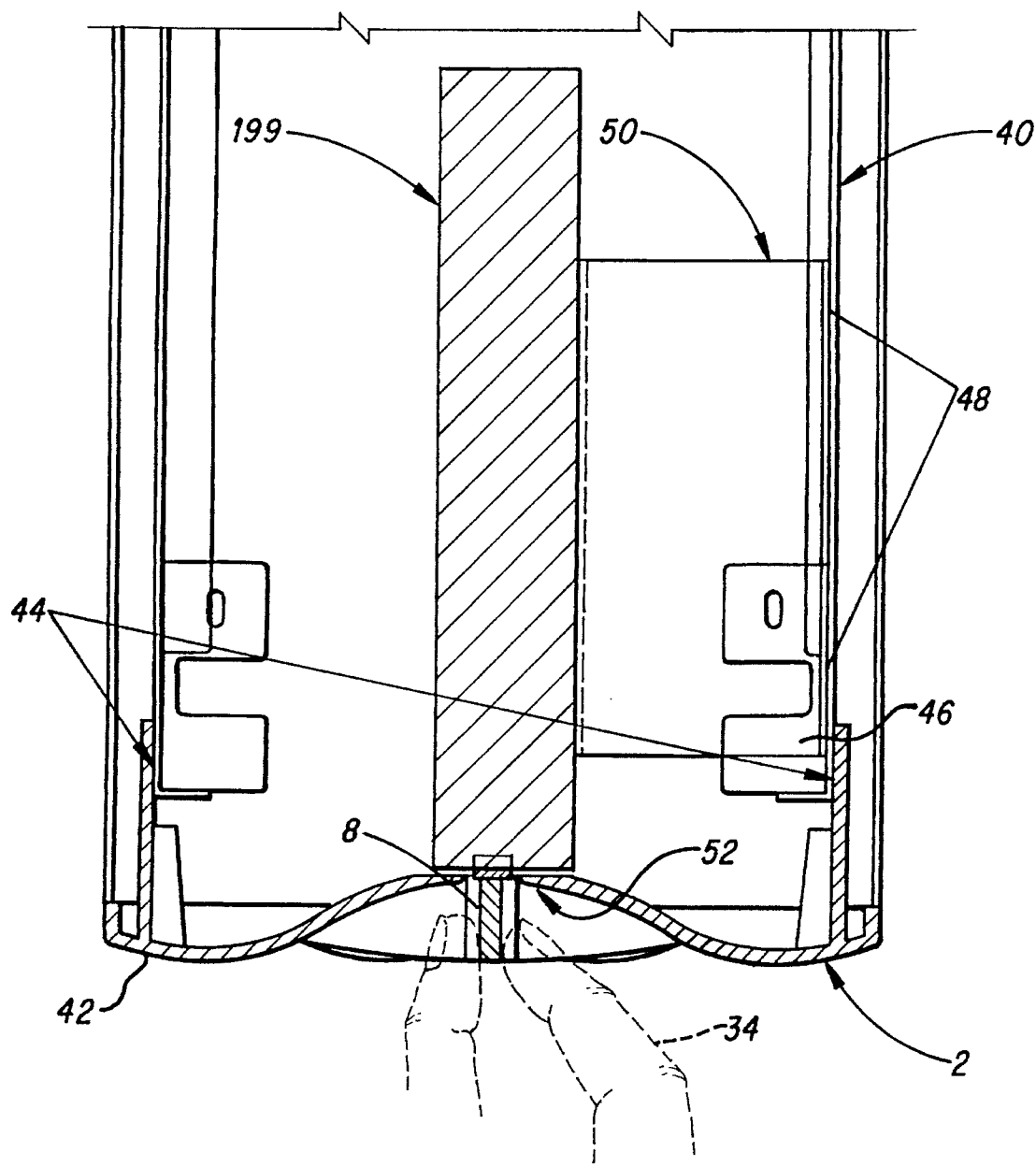
FIG. 2 is a cross-sectional view of the game processor console unit shown in FIGS. 1A to 1C.

FIG. 2 shows a top view of a cross-section of the console depicting the mounting of the floppy disk drive 199. The floppy disk drive 199 is conventional, except that the drive may be customized to reduce the likelihood that unauthorized copies of data/program files are made onto floppy disks. Once such customization is to set in a nonstandard fashion the track widths for the floppy disk read/write head such that a standardized floppy disk cannot read data stored on the disk and the floppy disk drive in the game processor cannot read data stored by a standardized floppy disk drive.

The console includes a structural frame 40 that is conventional and supports the computer components housed within the console 2. The console housing 42 includes flanges 44 that are adapted to be attached to the frame 40. Brackets 46 are attached by, for example, screws 48 to the frame. These brackets support structural stands 50 for the individual components in the console. The floppy disk drive 199 is attached, by for example screws, to a stand adapted to support the drive and position the drive in alignment to the slot 52 in the housing 42 for a floppy disk.

Figure 3A:
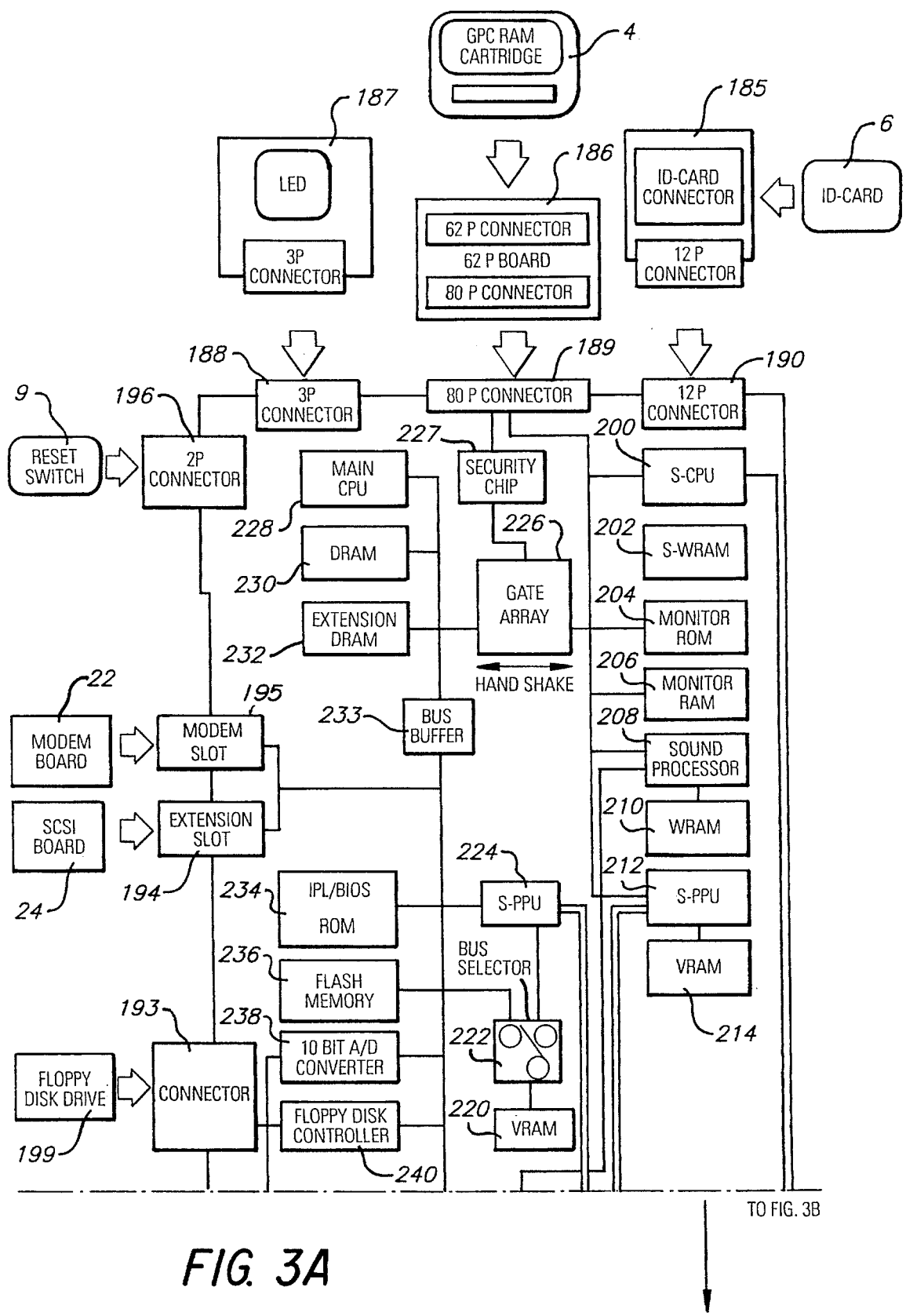
FIGS. 3A and 3B are more detailed block diagrams of an illustrative embodiment of the game processor system shown in FIG. 1A.
Figure 3B:
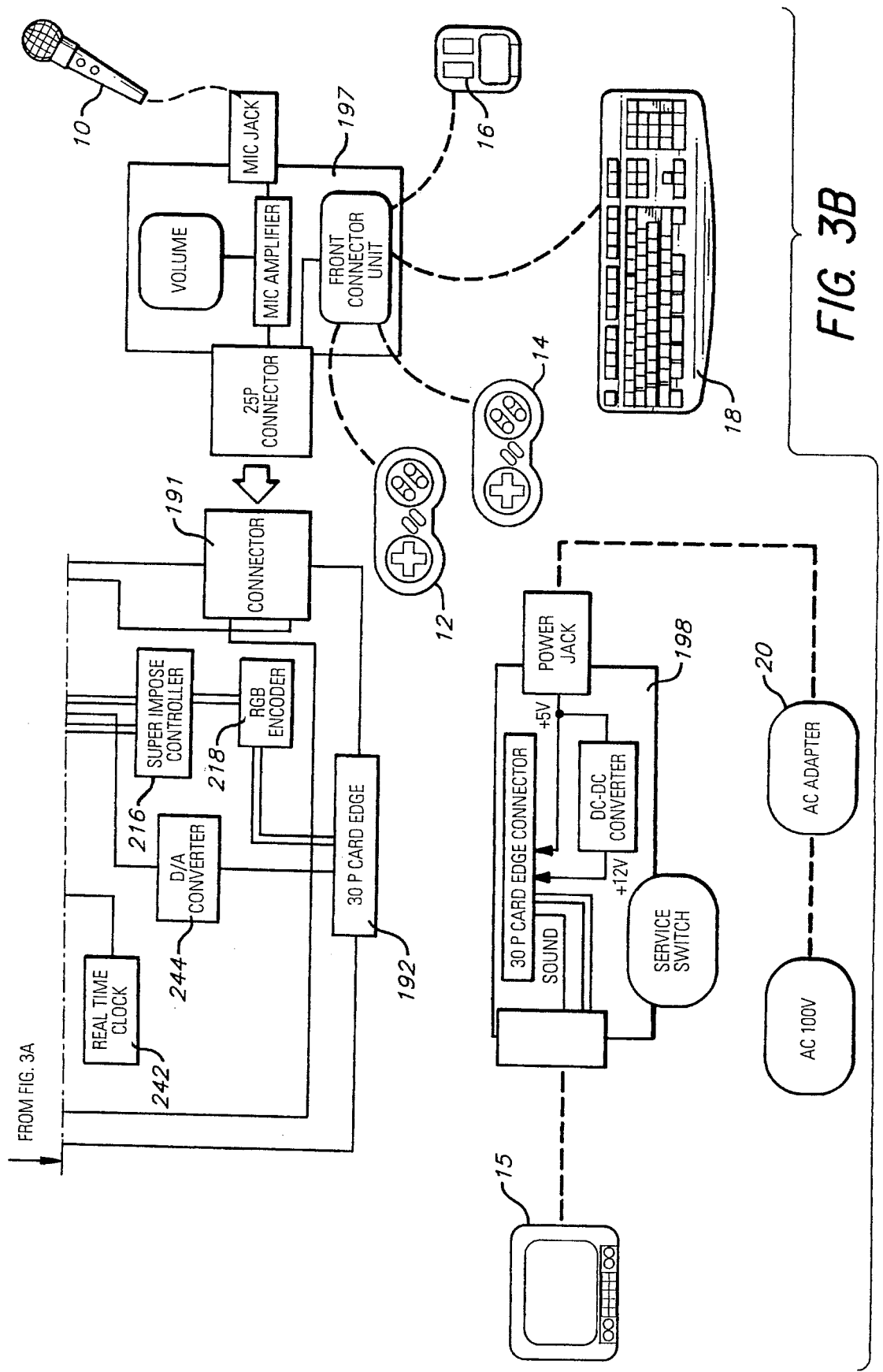

FIGS. 3A and 3B are more detailed block diagrams of the game processor system shown in FIG. 1A and are an illustrative embodiment which specifies details such as the number of connector pins, particular types of memory devices, etc. These and other implementation details are set forth only as an illustrative arrangement of one of many possible alternative arrangements for implementing the invention and should not be construed as limiting the scope of the present invention. FIGS. 3A and 3B identically numerically label many of the same input/output devices shown in FIG. 1A and show connections between the I/O devices and game processor system console 2 in greater detail than FIG. 1A. The controllers 12, 14, keyboard 18 and mouse 16 are coupled to the game processor system console 2 via a front board connector unit embodied on front board 197 of FIG. 3B. The connector, in turn, is coupled to 25 pin connector 191 on console 2. Microphone 10 is likewise coupled to the console's 25 pin connector 191 via a microphone jack and a microphone amplifier which is likewise coupled to the front board 25 pin connector. The microphone amplifier is controlled by a volume control on front board 197.

ID card 6 is coupled to console 2 via ID card circuit board 185 having an ID card connector and an 12 pin connector which, in turn, is connected to the console at 12 pin connector 190. RAM cartridge 4 is coupled to the console at 80 pin connector 189 via a 62 pin connector board 186 which includes a 62 pin connector for connection with game cartridge 4 and an 80 pin connector for connection to connector 189. The game processor I/O system also includes an LED board 187 having an LED display and a 3 pin connector which, in turn, is connected to 3 pin connector 188 on console unit 2. Reset switch 9 is coupled to permit resetting game CPU 200. Modem board 22 is coupled to console unit 2 via modem slot 195. An SCSI board 24 is coupled to a console unit 2 via extension slot 194. Floppy disk drive 199 which receives floppy disk 8 shown in FIG. 1A is coupled to console unit 2 via 34 pin connector 193 which, in turn, is coupled to floppy disk controller 240.

FIG. 3B includes interface board 198 which receives AC power via an AC adapter 20 and a power jack that is coupled to the 30 pin card edge connector on board 198 which, in turn, is coupled to the console's 30 pin card edge connector 192. Interface board 198 also includes a DC to DC converter coupled to the power jack and to the 30 pin card edge connector. The 30 pin card edge connector of board 198 receives video, sync, and sound signals from console unit 2 and couples such signals to standard television unit 15.

Turning next to the internal two CPU architecture of the game processor system console 2, as can be seen from FIGS. 3A and 3B, the hardware includes a game program executing CPU 200 (SCPU) and associated system components and an operating system and editing system main CPU 228 and associated system components to be described below. Additionally, console unit 2 includes gate array circuitry 226 through which a large part of inter-processor communication takes place and an associated superposition controller 216 for superimposing the editing and operating system video output onto the game program executing subsystem output.

Turning first to the game program executing subsystem, the game program executing hardware in the presently preferred embodiment may be implemented by hardware currently being sold by Nintendo of America as the Super Nintendo Entertainment System (SNES). The present invention, however, is not limited to Super NES related game program executing systems but rather may be used with alternative game hardware implementations. The game program executing game CPU 200 may, for example, be a 65816 compatible microprocessor. The game CPU 200 is coupled to working RAM 202 which, for example, includes 1 mega bit of storage. The game CPU 200 is coupled via system data, address and control busses to picture processing unit (SPPU) 212 which, in turn, is coupled to video RAM 214 which may, for example, include 512 k bits of storage.

The exemplary embodiment uses two picture processing units 212 and 224. PPU 212 includes circuitry for generating video game displays under the control of game CPU 200 and PPU 224 generates editing related video displays under the control of operating system CPU 228. Game CPU 200 has access to video RAM 214 via PPU 212 during vertical and horizontal blanking intervals. Thus, game CPU 200 can only access video RAM 214 through PPU 212 at times other than during active line scanning when PPU 212 is accessing video RAM 214. PPU 224 generates a video display from video RAM 220. As shown in FIG. 3B, the output of PPU 212 and the output of operating system PPU 224, are coupled to a user's television 15 via superimpose controller 216 which, in turn, is coupled to an RGB encoder 218 through the previously identified connectors to television 15.

Game CPU 200 is also coupled to sound processor 208 which is coupled to its associated work RAM 210. The sound processor 208 may comprise a commercially available sound chip to generate sounds associated with the video game program being executed. Game CPU 200 can only access work RAM 210 through sound processor 208.

In addition to components founds within an SNES system, the exemplary embodiment additionally includes a one mega bit monitor ROM 204 and a 256 bit monitor RAM 206. The monitor ROM contains program instructions which are executed by game CPU 200 to result in a transfer of control to the operating system CPU 228 for the performance of editing and information transfer functions. The monitor RAM 206 stores data associated with such processing.

The Super NES video game machine, which is represented in part in block diagram form in FIGS. 3A and 3B, has only been generally described herein. Further details regarding the Super NES including PPU 212 and PPU 224 (utilized by the operating system processor) may be found in U.S. Pat. No. 5,327,158 issued Jul. 5, 1994 entitled "Video Processing Apparatus" which application is expressly incorporated herein by reference. Still further details regarding the Super NES may be found in U.S. Pat. No. 5,291,189 issued Mar. 1, 1994, entitled "Direct Memory Access Apparatus and Image Processing System and External Storage Device Used Therein" and in U.S. application Ser. No. 08/138,448 filed Oct. 20, 1993, which is a continuation of U.S. application Ser. No. 07/793,735 filed Nov. 19, 1991, entitled "Mosaic Picture Display Apparatus and External Storage Unit Used Therefor" which applications are herein incorporated by reference.

The game processor system console 2 also includes an operating system or main CPU 228 which may be, for example, a NEC V810 processor which is a 32 bit RISC processor. Alternatively, for example, a Motorola 68000 Series Processor or other processors having similar processing power may be utilized. The main CPU 228 processes operating system related routines in parallel with the game CPU 200 which executes a video game program, as will be described further below. Main CPU 228 and game CPU 200 communicate through gate array 226 which is described in detail in the related applications incorporated by reference above. As indicated above, processor 228 (like game processor 200) includes an associated picture processing unit 224 for performing graphic processing operations to reduce the graphics processing burden on CPU 228. The operating system CPU 228 is coupled to video RAM 220 directly or via picture processing unit 224 depending upon the control setting of bus selector 222. As noted above, PPU's 212 and 224 are of the type described in the above identified SNES related patents and patent applications which have been incorporated herein by reference.

In accordance with the presently preferred embodiment of the present invention, main CPU 228 is a processor having a 32 bit bus width and operates at a 21.477 MHz clock rate. The CPU 228 is coupled to, for example, a 4 megabyte DRAM 230. The work DRAM 230 is expandable, if desired, to up to 24 megabytes via an extension DRAM 232. Main CPU 224 is additionally coupled to, for example, an 8 mega bit ROM 234 which stores an initial program loader (IPL) subroutine a BIOS operating system program, and character fonts to be accessed by CPU 228. CPU 228 also has access via its system bus to an 8 mega bit flash memory 236 which is utilized, for example, for software backup for data from floppy disk drive 199. The main CPU 228 system bus is also coupled to, for example, a 10 bit A/D converter 238 (which is utilized to digitize sounds coming from, for example, microphone 10 via board 197), a floppy disk controller 240 and real time clock 242.

The main CPU 228 and the game CPU 200 boot up independently. After power is turned on, the game CPU 200 is initially placed in a reset state and then restarted. Initially, the game CPU 200 executes program instructions out of monitor ROM 204. The main CPU 228 controls the areas of memory which are accessed by game CPU 200. The main CPU 228 loads a register in gate array 226 which identifies whether CPU 200 is to execute out of monitor ROM 204 or RAM cartridge 4. The main CPU 228 executes the initial program loading and operating system instructions in ROM 234 to read out the contents of floppy disk 8 including the model game software via floppy disk drive 199 and floppy disk controller 240. Operating system program instructions for controlling operations associated with the model game software are transferred to DRAM 230 for execution by main CPU 228. After system power has been turned off and thereafter turned on, main CPU 228 checks flash memory 236. When first started, the operating system program is read from the floppy disk 8 and stored in flash memory 236, and then rewritten to DRAM 230. The DRAM is a volatile memory and, thus, the console at start-up must read the operating system from the flash memory or floppy disk. Generally, the access speed for the flash memory is quicker than that of the floppy disk drive. Thus, the operating system comes up quicker when restarted and the operating system is read from flash memory, than when originally loaded from floppy disk.

Model software information from floppy disk controller 240 is initially buffered in DRAM 230 for transfer to the RAM cartridge 4. Main CPU 228 then generates a communication ready signal and transmits the signal to a handshake port in gate array 226. Game CPU 200, through instructions stored in monitor ROM 204, monitors the handshake port and prepares for reception of data and/or instructions from the communication RAM in gate array 226. The handshake port in this embodiment is a pair of one-way handshake ports. One of the one-way handshake ports communicates information from the main CPU 228 to the game CPU 200. The other handshake port communicates information from the game CPU 200 to the main CPU 228. The handshake port may also be a bidirectional port in another embodiment of the invention.

The handshake port includes a buffer register which is addressable by game CPU 200 which indicates whether information is to be transferred between main CPU 228 and game CPU 200. When game CPU 200 has determined that a communication RAM embodied within gate array 226 has received information from main CPU 228, game CPU 200 accesses the information from the communication RAM and transfers such information to RAM cartridge 4 via 80 pin connector 189 and connector board 186. The main CPU 228, after the communication RAM information has been transferred to RAM cartridge 4, sets a register embodied within gate array 226 which initiates switching of control of game CPU 200 from monitor ROM 204 to RAM cartridge 4. After the game CPU control has been switched to RAM cartridge 4, game CPU 200 no longer monitors the handshake port or has any further interaction with the communication RAM within the gate array. At this point, game CPU 200 operates to execute game related instructions out of RAM cartridge 4 in a manner substantially the same as the applicants' assignee's game machine described in the above identified SNES related patents and patent applications.

The main CPU 228 constantly monitors information transmitted via the CPU 200 system bus by accessing a register copy RAM embodied within gate array 226. The information written into the register copy RAM from the game CPU 200 bus is formatted such that it's compatible with the main CPU 228 format. Information from PPU 212 and sound processor 208 flows into the register copy RAM for monitoring by main CPU 228 such that main CPU 228 is continuously aware of the game state. The use of a 32 bit RISC processor provides main CPU 228 with the processing power necessary to monitor such a large volume of information. As is described below, both the images generated by main CPU 228 via its PPU 224 and VRAM 220 and game CPU 200 via its PPU 212 and VRAM 214 are simultaneously displayed on the user's television 15 through the use of a superimpose controller 216 which is described in detail below.

The main CPU 228 is continuously aware of game CPU 200 operations so that it will not initiate a user commanded "system break" to modify game play until all required information is written into VRAM 214 for display operations. A system break logic included in the gate array regulates the timing to generate a signal for a game break that is issued to the game CPU 200 when the system break command is executed. Thus, main CPU 228 monitors data on the game CPU bus, particularly information relating to generation of video display or sound to determine an appropriate point in time to execute a system break to thereby avoid distorted picture and sound information.

Figure 4A:
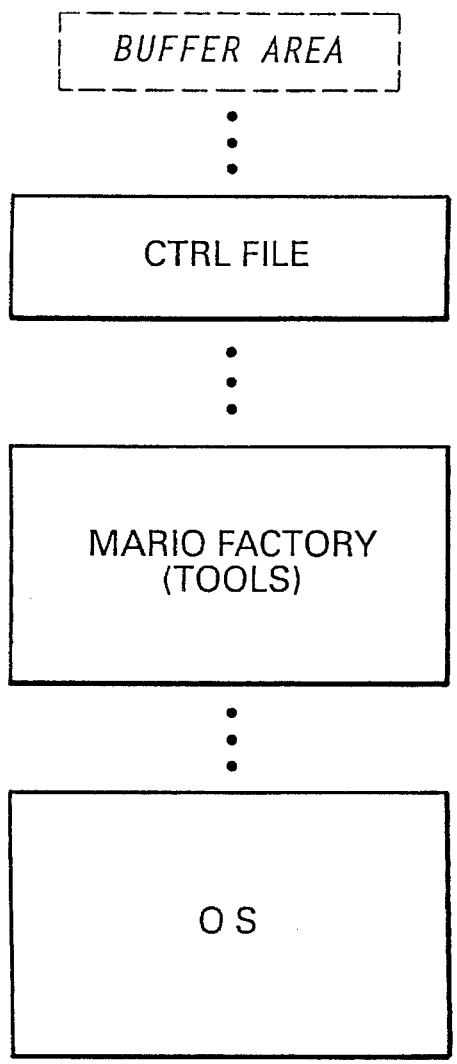
FIGS. 4A and 4B are memory maps of a part of the system memory space.
Figure 4B:
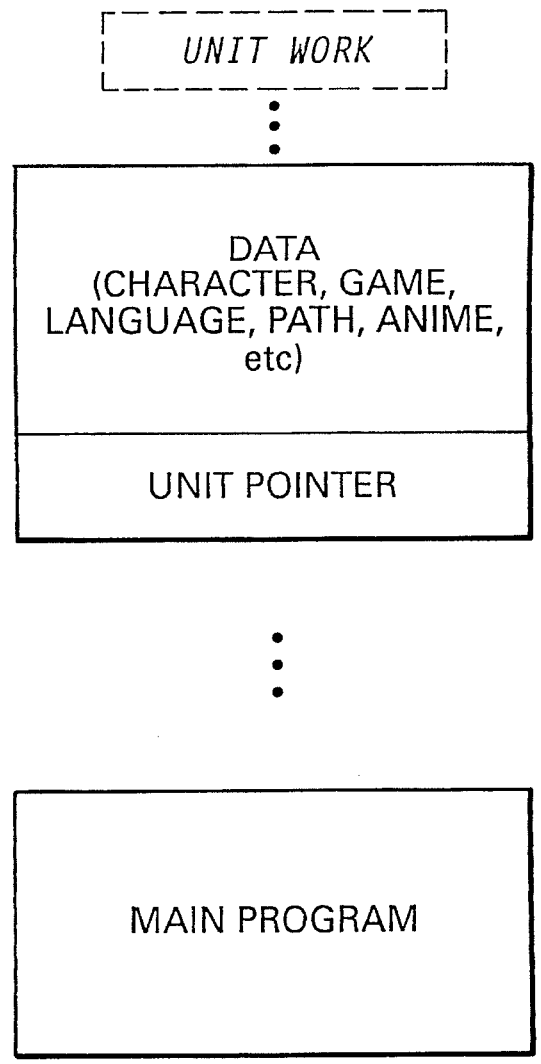

FIGS. 4A and 4B are partial memory maps of certain of the memory devices shown in FIGS. 3A and 3B after the transfer of information from the floppy disk 8 to the RAM cartridge 4. The model software stored on floppy disk 8 includes a control file, model game related data, unit pointer, address data and a main game program (as well as sound data not shown, which is coupled to sound processor 208). As can be seen from FIG. 4A, not all such model software is transferred to RAM cartridge 4, rather, DRAM 230 maintains a control file which stores data relating to the changing game conditions as selected by the user as well as editing (e.g., Mario Factory) and operating system software. When the model software is executed, the unit work data is generated by the main program of the model software. After a "system break" is initiated by the user to stop game play to modify a model game, unit work data, unit pointer and DATA for editing are transferred to a buffer area. When the edit of the control file is finished, the modified information (DATA and Unit Pointer information) is stored in the buffer area data and then transferred to RAM cartridge 4 which also stores the game main program.

The game processing system of the present invention is designed for use in various network configurations. The present invention contemplates "friend networking", i.e., an exchange of RAM cassettes 4 storing newly generated video games among users. Similarly, an ID card 6 and a floppy disk 8 may be carried to the house of a friend for use with a RAM cassette 4 in an identical game processing processor system.

Figure 5:
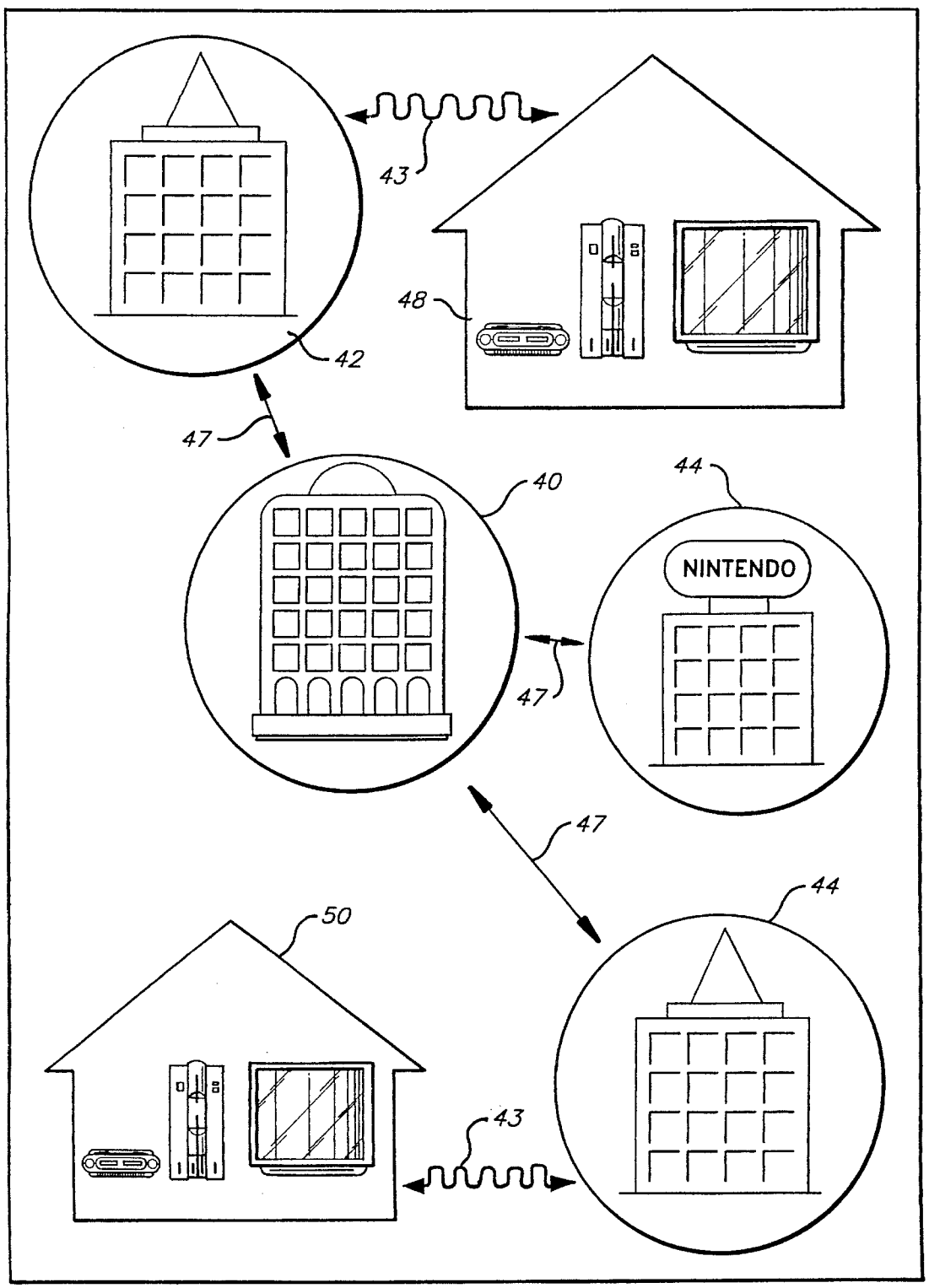
FIG. 5 is an exemplary on-line networking system in which the illustrative embodiment of FIGS. 3A and 3B may be used.

Additionally, as shown in FIG. 5, an on-line networking system is also contemplated. As shown in FIG. 4, game information may be transmitted via modem 22 shown in FIG. 1A over telephone lines 43 from a user's house 48 through an access point 42 to a game processor center 40 via a digital link 47. Similarly, game information may be transmitted from the house 50 of a friend via a telephone line 43 to an access point 44 and then to game processor center 40 via digital link 47. Game information may also be transmitted from the game manufacturer (such as, for example, Nintendo) 46. In the on-line networking system shown in FIG. 4, it is possible to readily supplement the model software embodied on a user's floppy disk 8 to add to the model video game software to be modified.

In accordance with one exemplary embodiment of the present invention, the model software stored on the floppy disk 8 includes a portion of the video game designed by a manufacturer which a user cannot change. This portion of the model software is referred to as the "base file". The "user file" is the portion of the video game that a user can change. In the system shown in FIG. 5, the user file may be transmitted via the network to the house of a friend having a game processor system to permit interactive game play between users or to permit a friend to play a modified version of a newly designed game. The access points 42 and 44 are provided to, for example, minimize the telephone charges associated with transmitting a game over extremely long distances. The game data would then be relayed to the game processor center 40 via direct digital links 47. The game data after being received at the game processor center 40 is thereafter retransmitted to the appropriate destination.

Figure 6:
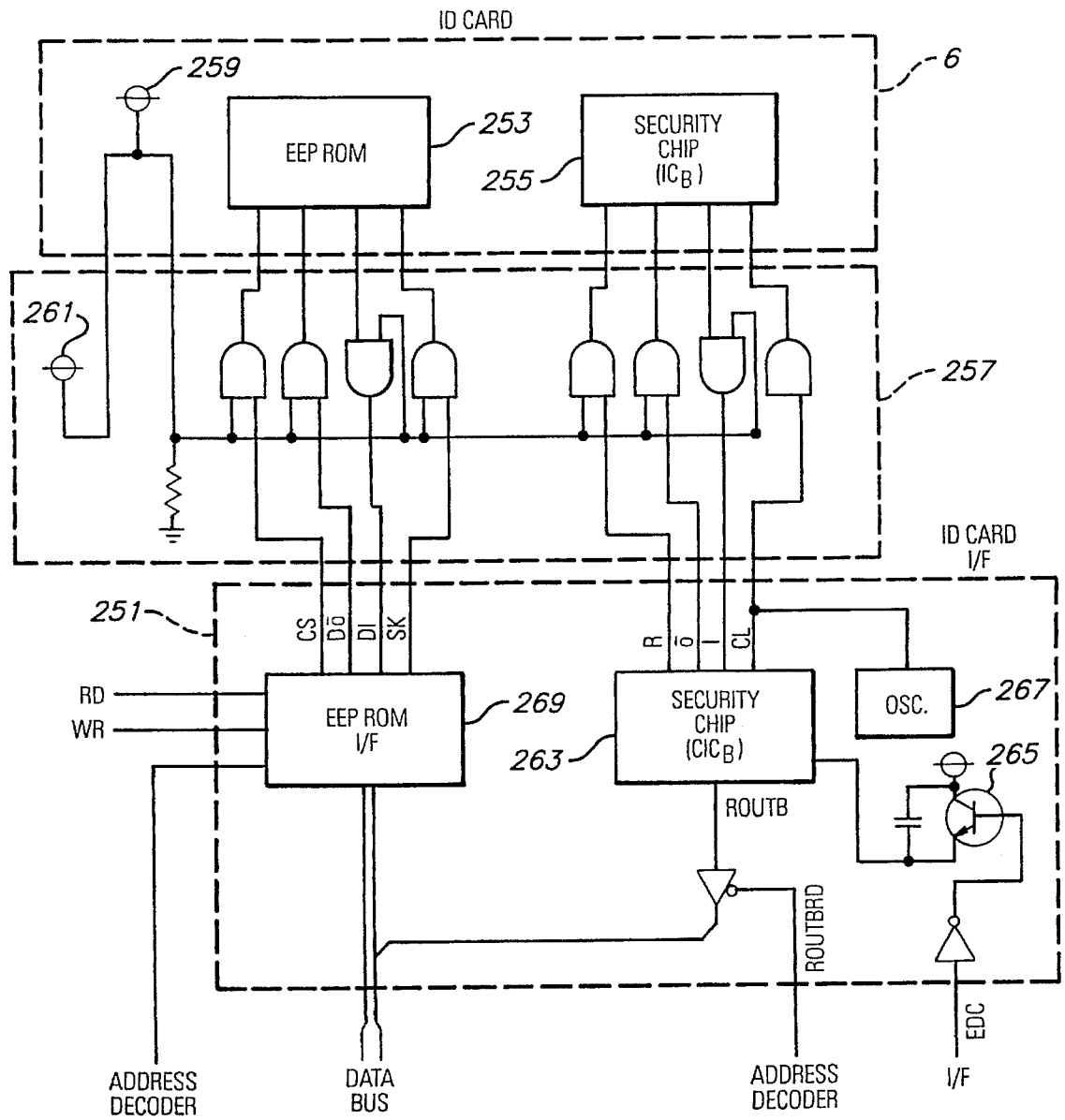
FIG. 6 is a detailed block diagram of an illustrative ID card and ID card interface for the exemplary embodiment of the game processor system shown in FIG. 1A.

FIG. 6 shows a schematic diagram showing an exemplary ID card circuit 6 and ID card interface (I/F) 251 which may be included in the ID card connector 185 and gate array 226 shown in FIG. 3A. The ID card may include a memory device 253, such as an EEPROM, that stores data/programs, ID data and file type data, described above, and a security integrated circuit (CIC) 255 for use in testing the authenticity of the ID card. The memory device and security circuit on the ID card are electrically connected to contacts (not shown) on the card that are connectable to corresponding contacts (not shown) in the ID card connector 185. These connector contacts may be integrated with a bank of AND-gates 257 that shield the memory device and security circuit in the ID card from electrical signals until the card is fully inserted into the GPC console. In this regard, the ID card may include a recessed contact 259 that conducts current from a voltage source 261 in the console back to the console only after the card is fully inserted in the console and all other contacts have been established between the card and card connector 185.

The ID card interface 251 in the console includes a security circuit 263 that may execute an authentication algorithm with the security circuit 255 in the ID card when reset by a transistor switch 265. U.S. Pat. No. 4,799,635 describes a suitable system for using security circuits to authenticate game cartridges. An oscillator 267 may also be provided to establish a clock (cl) signal for both security circuits. The security circuit in the ID card interface includes a output (ROUTB) coupled to the main-CPU, such as to a reset port or data bus. The output signal ROUTB is watched by main CPU 228 and the main CPU 228 resets the game CPU 200 when the ROUTB signal becomes active. In addition, the ID card interface includes a memory device 269, such an EEPROM, for storing ID data transferred from or to the ID card. Data to or from the memory device 269 may be transferred via a data bus with the main-CPU. Similarly, the main-CPU controls an addresses decoder that access the memory device and the security circuit, and read (RD) and write (WR) lines to the memory device.

Figure 7A:
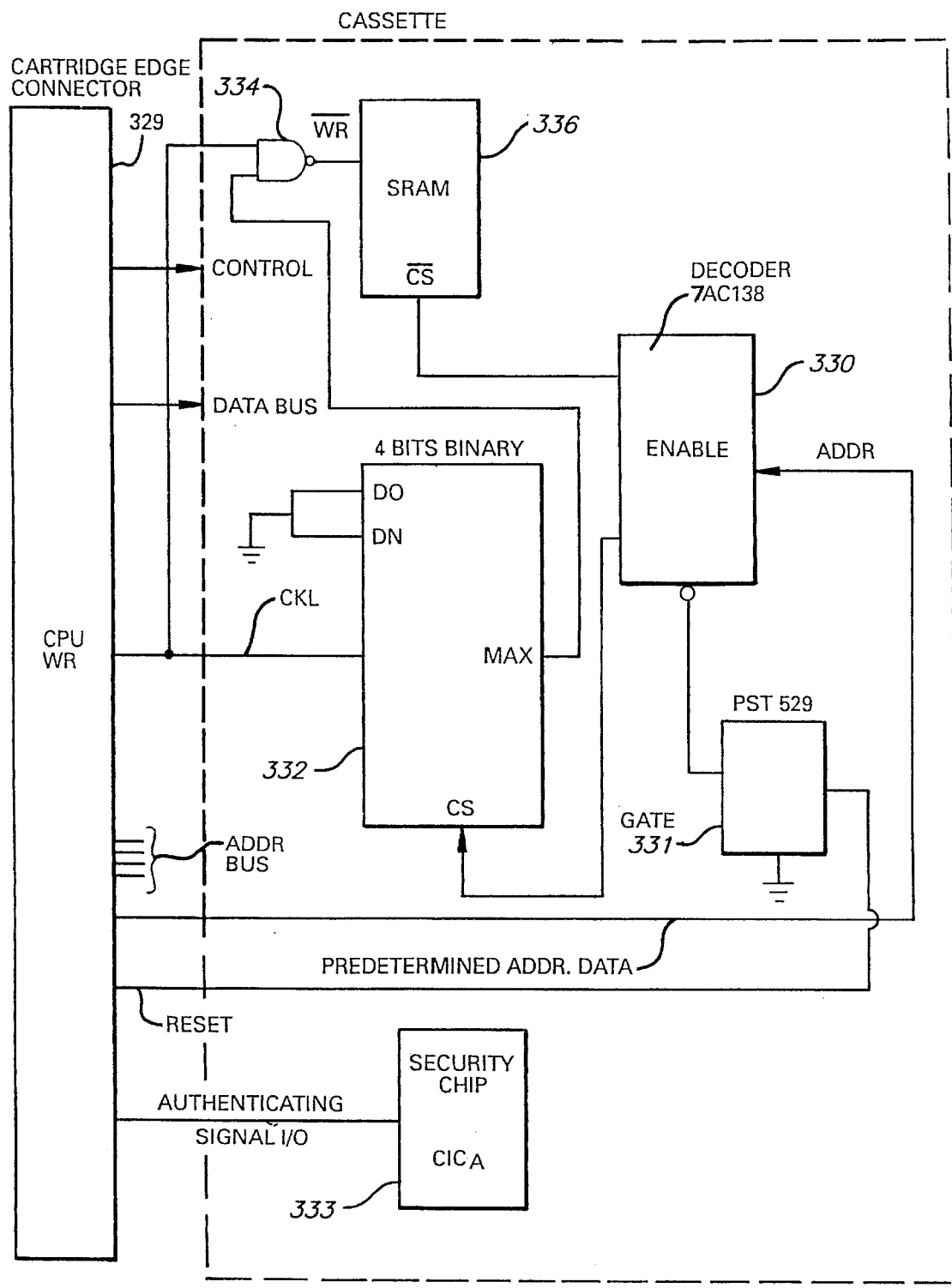
FIGS. 7A and 7C are simplified schematic diagrams of RAM cartridge 4.
Figure 7B:
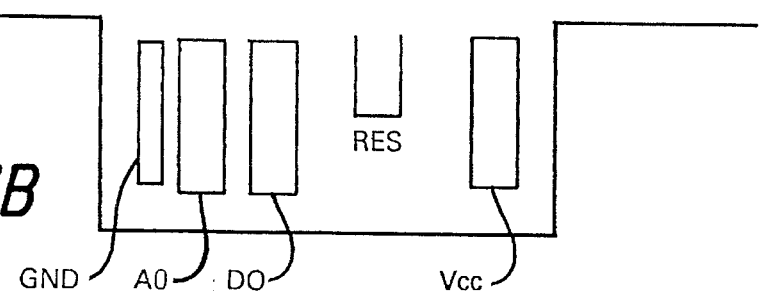
FIGS. 7B and 7D show the ground, address, data, reset, and power connectors for the cartridge 4.

FIG. 7A is a simplified schematic diagram of RAM cartridge 4 which is used in the exemplary embodiment of the present invention to address potential problems which may develop under rare circumstances due to removal or insertion of a cartridge from the game processor system console 2 while the power is on. As shown in FIG. 7B, to preclude the unlikely possibility of cartridge components being damaged due to insertion or removal while the power is on, the pins in the cartridge edge connector are modified such that a pin which enables the cartridge RAM memory is shortened with respect to the power pin.

FIG. 7B shows the ground, address, data, reset, and power connectors for the cartridge 4. The reset pin from the game cartridge is shorter than the power line pin so that when the cartridge is pulled out even before the signal lines are disconnected, the enabling "reset" signal prevents the cartridge RAM from being written to prior to the power being disconnected. When the cartridge is inserted, the power and data lines are connected prior to the reset signal being placed in a high state to thereby enable writing to RAM 336 as a final operation. In this fashion, the information stored in the cartridge working RAM 336 is protected. When the cartridge is inserted into its connector, power is applied prior to enabling of the cartridge memory circuitry. When the cartridge is removed, the cartridge circuitry is disabled before the power is disconnected due to the shortened enable signal receiving pin.

Turning to FIG. 7A, when the cartridge is fully inserted with the power on, the reset signal (RES) is high. The reset signal is coupled to the enable input of a decoder 330 via a gating circuit 331. Decoder 330 includes one output coupled to a chip select pin of the game cartridge static RAM memory 336 (which is schematically shown in FIG. 7A). A further decoder 330 output is coupled to the chip select pin of four bit binary counter 332. The binary counter is initially set at 0. Decoder 330, which is coupled to the game cartridge address bus, detects a request to write to counter 332 and increments the counter 332. When a write pulse is issued fifteen times, the counter 332 state is 1111, and counter 332 generates an output signal which is coupled to gating circuit 334. If an attempt is made to write into SRAM 336 when the output of counter 332 is at a high level, a write signal is coupled to (each of the RAM modules which constitute) RAM 336 to thereby permit data to be written into the cartridge RAM. Thus, the cartridge includes a write protect circuit to require writing to a predetermined address area fifteen times before permitting writing data into the RAM to preclude any possibility of component damage or loss of data when the cartridge is inserted or removed with the power on. When an attempt is made to write to a predetermined address fifteen times, the cartridge memory system is in effect unlocked. In the game processing system of the illustrative embodiment, the time spent writing into the RAM cartridge 4 is very small.

FIG. 7A also shows a cartridge edge connector 329. Among the signals coupled to the cartridge 4 are data signals and address signals carried on a data bus and address bus. Additionally, a reset signal is received, CPU read/write control signals and other control signal as received. The RAM cartridge shown in FIG. 7A additionally includes a security chip 333 which operates with security chip 227 (FIG. 3A) in a manner described in applicant's assignee's U.S. Pat. No. 4,799,635 which patent is hereby incorporated by reference. After RAM cartridge 4 is fully programmed for use in an SNES game system, the security chip 333 may be used as part of a security system to determine whether the cartridge is an authentic game cartridge in conjunction with the SNES game console that includes a corresponding security chip 333. Additionally, CPU 228 receives the output from security chip 227 and prevents game program execution and editing by CPU 200 unless there is a determination of authenticity in accordance with the teachings of '635 patent. In this regard both the security chip 333 and the main CPU 228 perform processing operations as generally disclosed in U.S. Pat. No. 4,799,635. Data indicative of the results of such processing are exchanged in a secure manner. If the main CPU 228 determines that the RAM cassette is not authentic based on data received via the gate array 226, the game CPU 200 is maintained in a reset state.

Figure 7C:
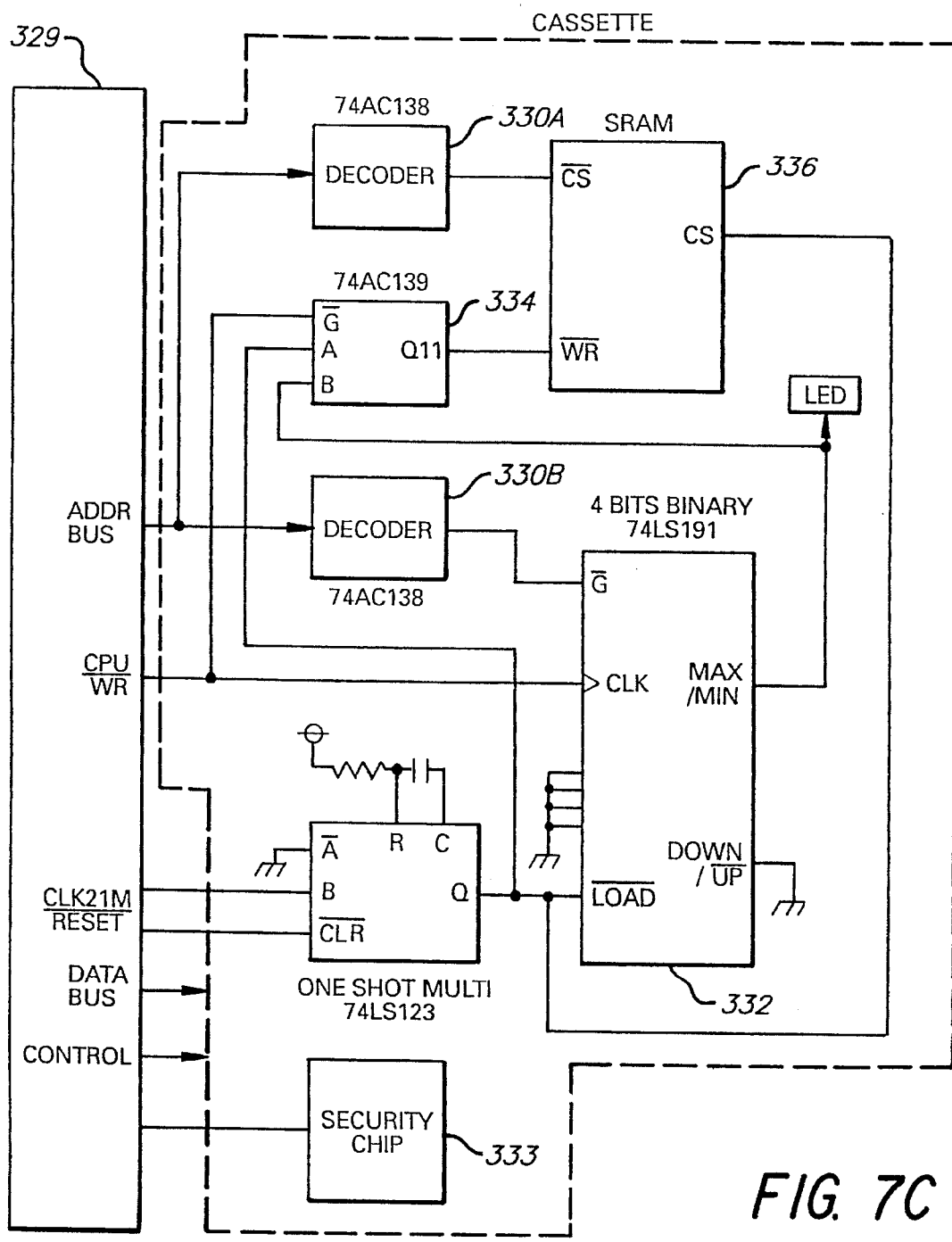
Figure 7D:
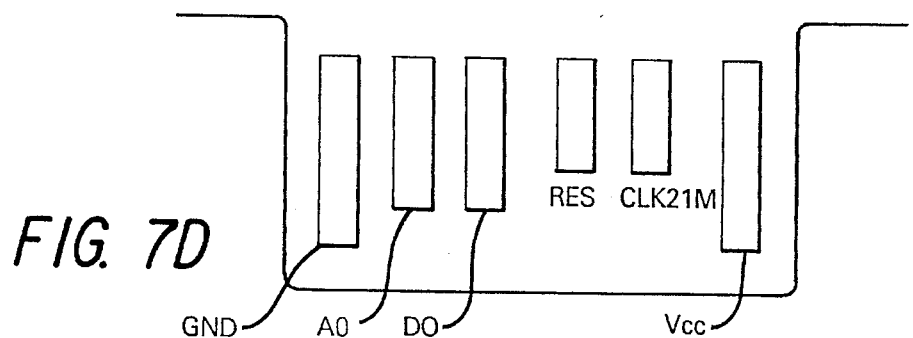

FIG. 7C shows an alternative circuit to corresponding FIG. 7A. The one slot multi-vibrator (74 LSI Z3) sends a load signal to counter 332 when there is no CLK21M signal. The counter 332 is set to "0" by the load signal and then writing into S-RAM 336 is disabled. In normal operation, the CLC21M signal is continuously supplied from console continuously, so the load signal is always disabled and the S-RAM can be accessed in the same manner as in the circuitry of FIG. 7C. FIG. 7D shows the connectors corresponding to the circuit shown in FIG. 7C. When the cartridge is pulled out of the console, the CLK21M signal stops before other signals. If there is no CLC21M signal, then the load pulse becomes enabled. Thereafter, counter 332 loads "0" data to disable writing into the S-RAM. In FIG. 7D, the address bus and data bus connectors shown as being shorter than the GND and VCC pins. In view of this connector arrangement, a "LATCH UP" is prevented when the cartridge is pushed in while power is on.

Figure 8A:
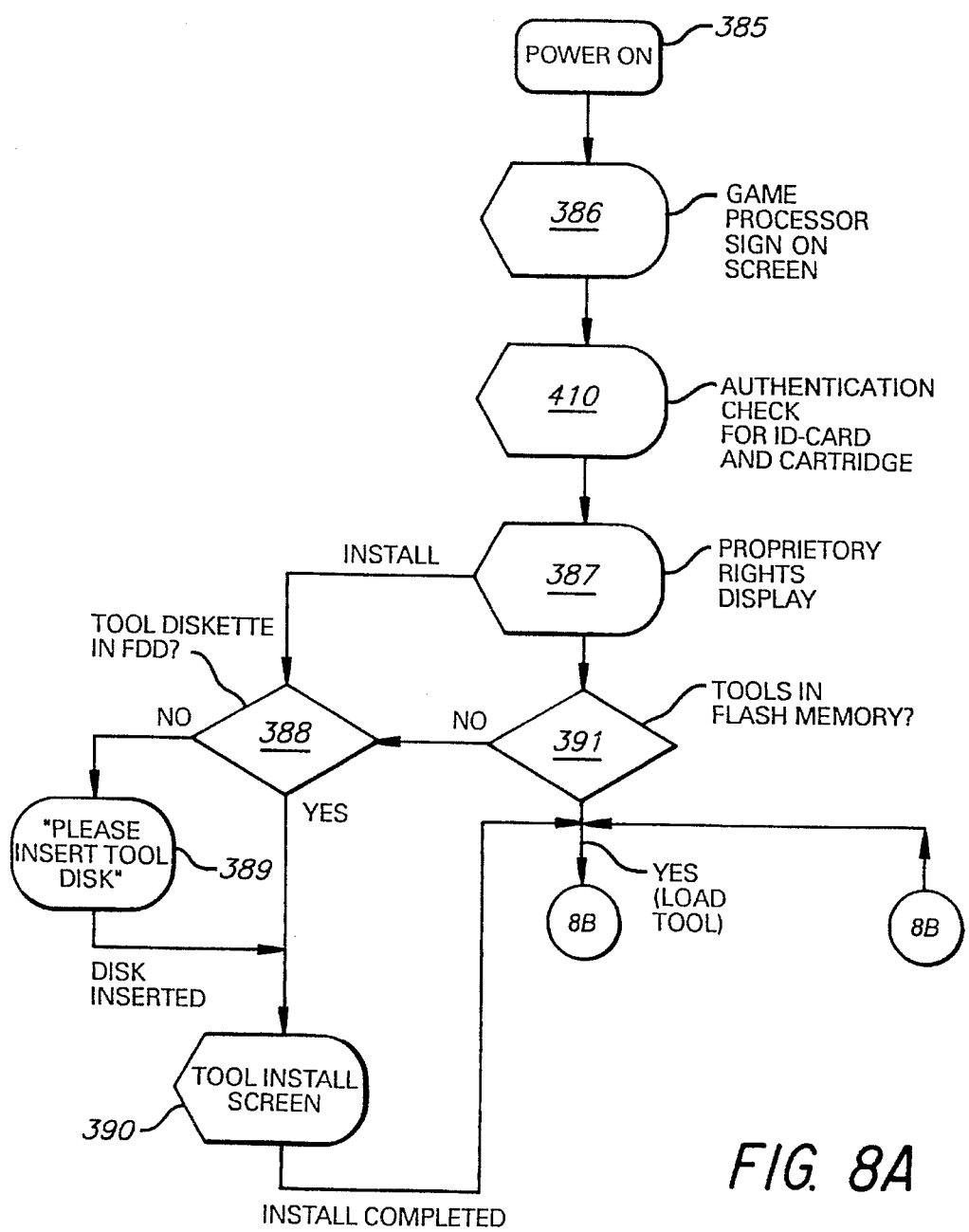
FIGS. 8A and 8B are flowcharts which show the sequence of operations in accordance with an exemplary embodiment of the present invention from power on through the appearance of the "Mario Factory" utility title screen.
Figure 8B:
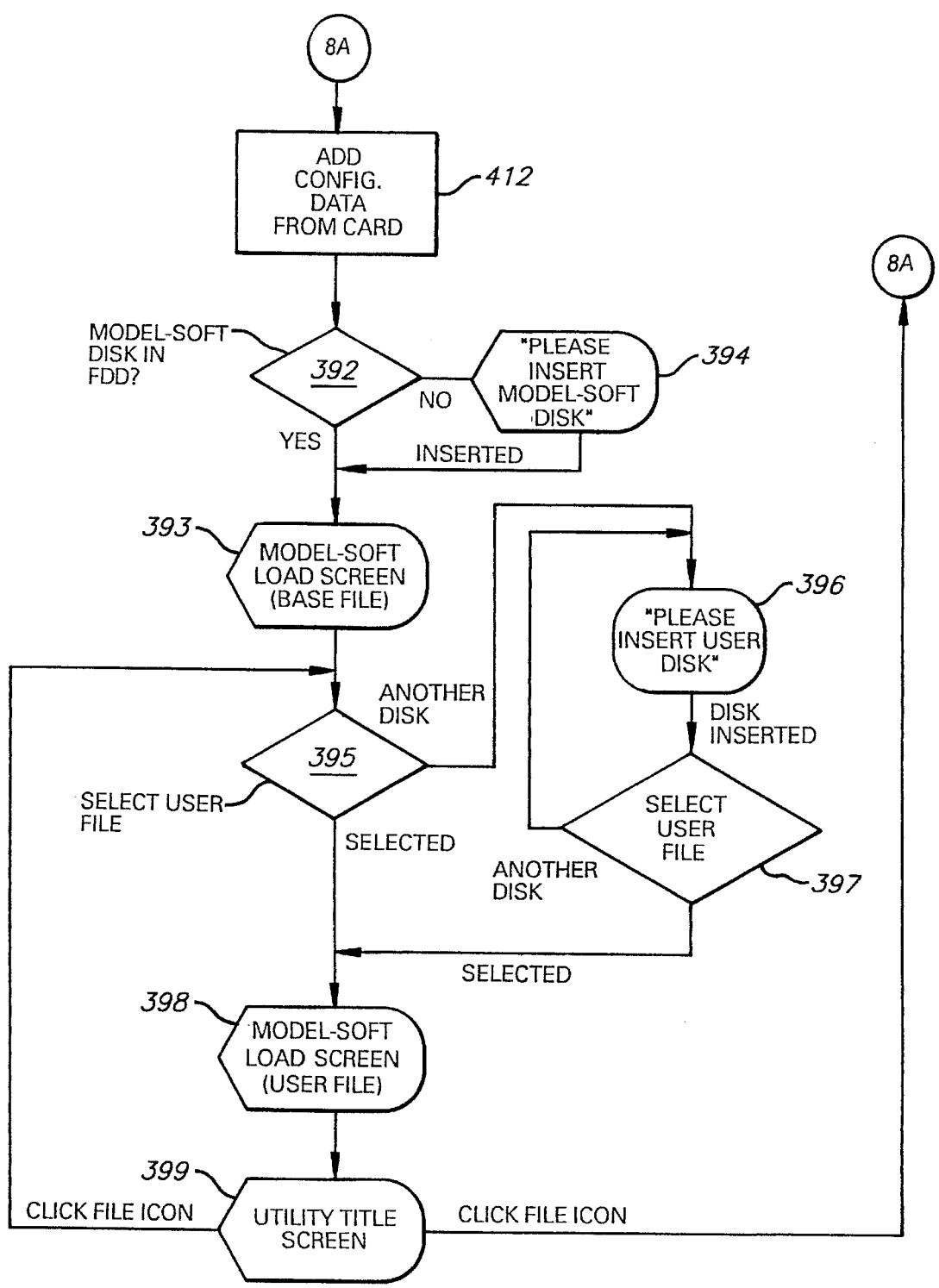

FIGS. 8A and 8B are flowcharts which shows the sequence of operations in accordance with an exemplary embodiment of the present invention from power on through the appearance of the "Mario Factory" utility title screen. After the power is turned on (385), an initial sign-on screen is displayed (386). Authentication routines 410, described in detail below, are executed to determine whether an authentic game cartridge is inserted into the cartridge connector and whether the ID data in the ID card matches the ID data for the model game software and/or new user data on the floppy disk inserted in the floppy disk drive. Thereafter a copyright information display is generated (387). A check is then made to determine whether the game editing tools associated with the illustrative embodiment are already stored in flash memory 236 shown in FIG. 3B (391). If the check at block 391 indicates that the tools are in flash memory 236, then the tools are transferred to DRAM 230 associated with CPU 228 and the Mario Factory execution may begin. Thus, if the editing tools are already in the flash memory, Mario Factory is automatically loaded. If the check at block 391 indicates that the editing tools are not in flash memory 236, then a check is made at 388 to determine if the tool diskette is in the floppy disk drive. If the floppy disk diskette is not in floppy disk drive 199, then a message is displayed to the user indicating "please insert the tool disk" (389). Upon detection of the tool disk being inserted, a tool installation screen is generated (390) and the Mario Factory loading is completed. Similarly, user configuration data from the ID card is downloaded (412) from the card and incorporated into the operation systems, such as at the config.sys file, executed by the main-CPU.

In accordance with one exemplary embodiment of the present invention, the model software is loaded such that two distinct files are stored: a base file containing non-modifiable aspects of the game and a user file containing those elements of the game that a user may modify. Alternatively, only the base file need be initially loaded to provide the user with the fundamental aspects of game play from which to build upon and create new games within the genre of games associated with the base file.

The check at block 392 determines whether the model software is in the floppy disk drive. If the model software is not in the floppy disk drive 199, the user will be prompted to install the model software disk (394) and a model software load screen is generated (393). Thereafter, a check is made if a user file has been selected by the user (395). The user file may be loaded on a different disk than the base file (which is why the selection of the user file in block 395 may require the insertion of another disk). The user file contains the changes made to the model software video game to date. Initially the user file is in a default stage where the model software defines the initial game play. As the user changes the game, the default information is changed to reflect the user's editorial modifications. Both the game cartridge and the floppy disk include a base file and user file, however, the floppy disk will store the original default version of the game whereas the game cassette will not. The RAM cassette data is modified in real time such that default data is not resident on the cassette 4. Once the user file has been selected, a user file load screen is displayed (398). If a user file is not selected, the user will be prompted to insert a user disk (396) and the user will have an another opportunity to select a user file (397). Thereafter a utility title screen (399) is displayed on the screen.

In block 392 the model software may be changed as desired by the user by inserting another disk. Once the utility title screen is displayed, a user may click a particular file icon which leads to branching back to block 395 in which the user can select another user file. Alternatively, the routine may branch back to block 392 in which the entire genre of games may changed by changing the model software. The Mario Factory program includes a large variety of editing tools such as "dot" for drawing particular characters "animation data" for controlling animation, etc.

The game processor system, in accordance with the exemplary embodiment described herein, includes software under the control of CPU 200 and software under the control of main CPU 228. The software operated by the CPU 200 includes the model game software described above and user fabricated game programs. The main CPU 228 executes various utility programs, operating system, peripheral driver programs, and BIOS and IPL software. The utility software operated by the main CPU 228 includes game editing tools, network software, word processing software, disk management software, etc. The operating system and peripheral driver software includes subroutines for supporting peripheral devices not fully supported by the BIOS software described below.

The BIOS software includes low level routines for direct interaction with the above described system hardware. More specifically, the exchange of information between the main CPU 228 portion of the system and the game CPU 200 subsystem is controlled from a software perspective by way of two BIOS operating system routines, one of which is resident in BIOS ROM 234 and the other which is resident in monitor ROM 204. The operations performed during such information transfer by these operating system routines are described below. The BIOS routines control the various I/O devices shown in FIG. 3A and 3B such as mouse 16, keyboard 18, controllers 12 and 14, display 15, modem 22, and control processor intercommunication, memory maintenance functions and PPU control functions. PPU 212 functions controlled by the CPU 200 BIOS software includes, for example, setting of the PPU's color generating RAM to define predetermined desired color maps, transferring data to the VRAM 214, setting superposition priorities, etc. Screen display related functions that are controlled include setting the cursor position. Keyboard functions that are controlled include keyboard initialization, obtaining keyboard buffer data and obtaining keyboard status information. Similarly, for the mouse, a variety of functions controlled by BIOS software including mouse initialization, obtaining the cursor position of the mouse, etc. BIOS software associated with controlling operations of the game CPU 200 include initialization of the game CPU, transferring data to the sound processor 208, working RAM 210, and functions associated with the exchange of data with the main CPU 228. The BIOS software associated with the main CPU 228 includes controls functions such as setting the real time clock, checking the time-out counter in gate array 226, and performing operating system housekeeping functions such as those which are typically performed in conventional operating systems such as MS DOS. The operating system software has a terminal function to receive some commands from other computers so that the game programs received via the SCSI board 24 in FIG. 3A from an IBM compatible PC may be executed and edited.

The IPL software is responsible for initial program loading such that when the system is booted up it checks the game processor system status and boots up the BIOS in the operating system routines. The initial program loading (IPL) routine is executed upon system start-up and initially results in the display of the start-up message, including a copyright notice. Thereafter, the IPL performs an ID code check in which a cyclic redundancy code (CRC) in the membership ID card is checked. If a determination is made that the ID card is authorized, the system is booted up. If the ID check reveals that the ID is unauthorized, a display is generated indicating a lack of authorization. If the ID code check passes to permit the system to be booted up, a hardware status check is made. The hardware status check determines the size of the RAM of the current system configuration and checks to make sure the connected RAM is readable and writable. Thereafter, checks are made to confirm that the floppy disk driver, modem, printer, hard disk and other devices within the control unit and expansion unit are appropriately connected. If all hardware status checks do not confirm proper connection, an appropriate display is generated to indicate a system fault.

If all hardware status checks indicate proper connection, then a check is made of the operating system ID code. In this check an ID code within the operating system is checked and boot up proceeds if the check passes. If check fails, then a display indicating a system fault is generated. If the ID code check confirms the proper ID code then the operating system is booted up.

The security checks are designed such that at multiple levels throughout the system, there are security systems implemented. As noted above, in the initial program loader (IPL), an ID code check is made to detect an unauthorized ID card. An ID code check is also made to indicate the use of an unauthorized OS/BIOS. Additionally, as described above, a security chip is utilized in the RAM cassette 4 determines whether the system is connected to unauthorized hardware. Additionally, at the BIOS/OS level, an ID code check is made to determine whether there is inappropriate access to a base file. An ID code check also determines whether there is unauthorized network access as well as use of unauthorized utilities. If these ID code checks fail, the attempted file operation is disabled. The BIOS/OS also uses an associated, unique data formatting and/or file compression methodology that makes read-out by machine architectures, other than that described herein, difficult.

The operating system includes a kernel portion which interprets commands, manages memory, reads in transient operating system portions and starts up command routines. The kernel reads the "config.sys" file, which records such things as the set up of peripheral drivers and unpacks the transient operating system, transient BIOS, peripheral drivers, etc. on to memory and manages them. The config.sys file may be tailor to individual users by importing data from the user ID card in step 412. A command routine portion of the operating system includes subroutines that perform actual operations based on instructions from the kernel and the peripheral driver section of the operating system includes subroutines that handle access to the various peripherals as described above.

Figure 9:
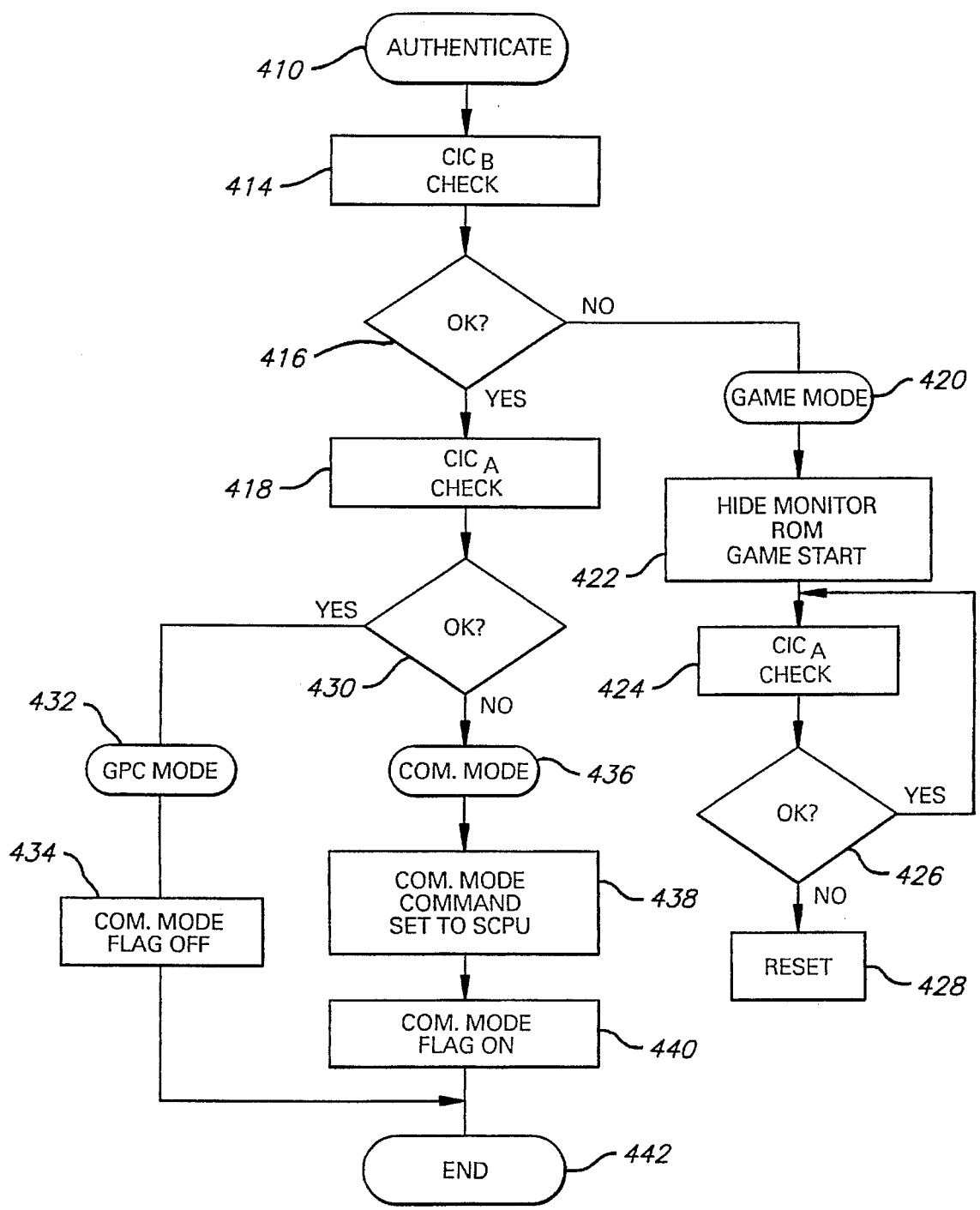
FIGS. 9 to 13 are flowcharts that show the sequence of operations in accordance with an exemplary embodiment of the present invention during authentication of an ID card and/or game cartridge, writing/reading to and from a floppy disk at downloading of programs and data files from remote locations.

FIG. 9 shows a program flow diagram for the authentication step 410 shown in FIG. 8A. This dual-authentication routine determines whether an authentic ID card and cartridge are inserted in the game processor console before game editing, copying or play is permitted. After the sign-on screen is displayed on the display, the main-CPU begins its authentication procedure by commanding (414) the pair of security circuits ($CIC_b$) in the ID card 6 and ID card interface 263 to confirm that the ID card is an authentic CARD. An exemplary pair of security circuits is described in U.S. Pat. No. 4,799,635. In step (416), if these security circuits authenticate each other, the main-CPU commands a similar pair of security circuits 333 in the game cartridge and cartridge interface to authenticate each other. Alternatively, only one of the security circuits may determine authenticity of the game cartridge while the other circuit simply operates in cooperation with the authenticating circuit.

If the security circuits do not confirm authentication in step 416, then there is no valid ID card in the console and the console cannot be operated to copy games or function as a personal computer to edit games. However, even without a valid ID card, the console may be operated (420) as a video game player machine (without the capability of editing or copying games). To determine whether the console may play games, the main-CPU first inhibits the game editing function (422) by preventing access to the monitor memory (Monitor ROM) coupled to the main-CPU circuitry portion of the console. In addition, the game-CPU is commanded to start a game and the security circuits in the cartridge and cartridge interface are commanded to authenticate each other (424), as in step (418). This authentication of the cartridge is repeated (continuously or for a period of time) during game play (426). If the cartridge security circuits fail to authenticate, then game play is inhibited (428).

Assuming that a valid ID card (416) and an authentic game cartridge (430) are connected to the console, then the game personal computer is fully enabled for game play and game editing (432). The computer sets the command flag to "on" to indicate that the console is in the "computer mode" (step 440), and to "off" to indicate the game processor mode (step 434). When the command flag is on, the game start command in the main CPU 228 is disabled and the console functions for only game play. If the ID card successfully authenticates (414, 416), but no game cartridge is inserted in the console or the cartridge does not successfully authenticate (418, 430), then the console is limited to functioning as a personal computer and is inhibited from functioning as a video game play device. To restrict operation to a personal computer (436), the main-CPU (438) sends a command (COM.MODE) via the gate array to the game CPU (SCPU) that inhibits operation of the game playing functions of the game CPU (440). At the end of the authentication subroutine (442), the main-CPU continues with its operation and causes an initial screen to be displayed (387).

Figure 10:
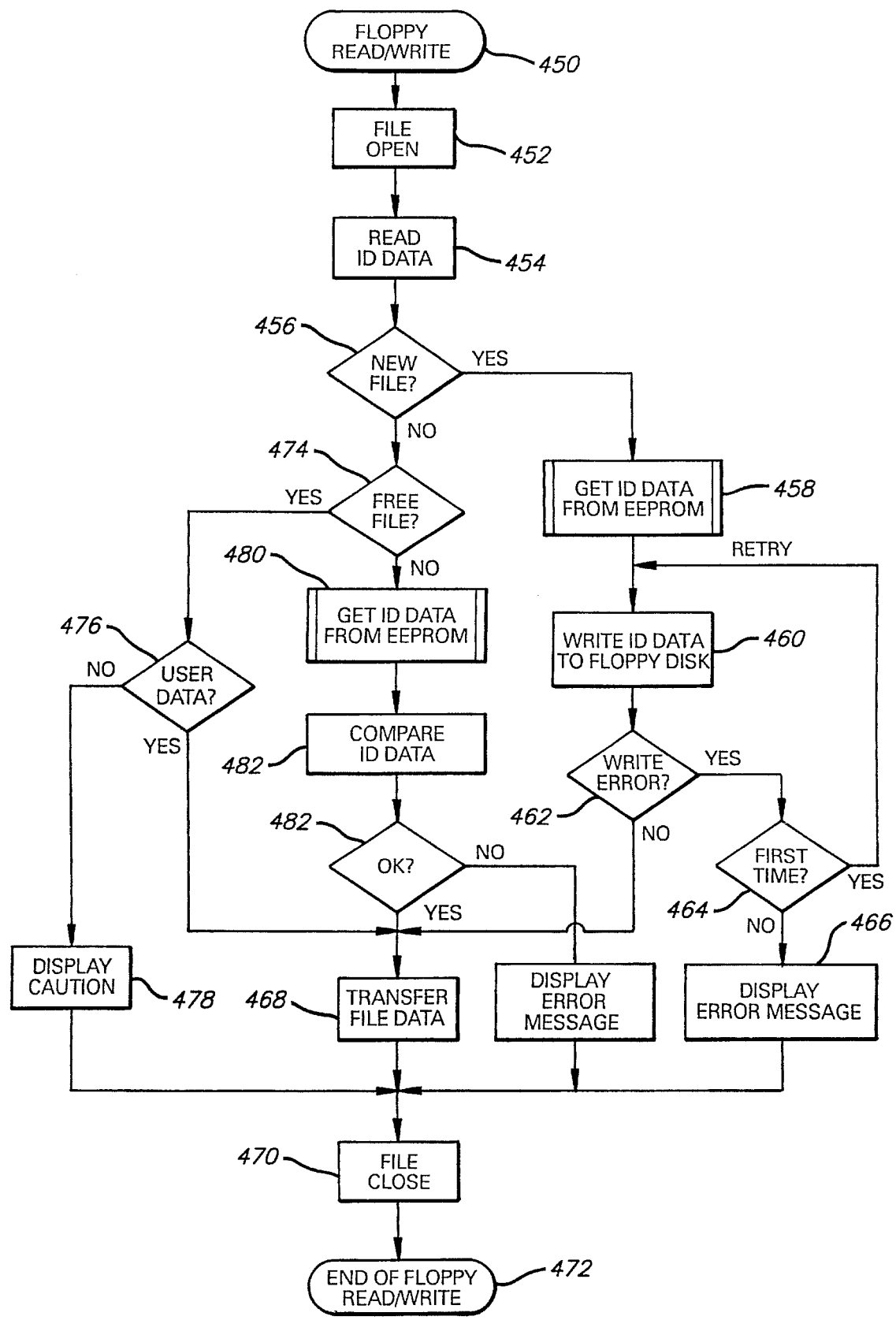

FIG. 10 is a program flowchart showing the security procedure for read and write operations to a floppy disk 8 on the floppy drive 199. Because games may be copied onto a floppy disk drive, there is a potential danger that an unauthorized user will make an illegal copy of a game program using a floppy disk and the floppy disk drive. Accordingly, security procedures have been developed to inhibit the floppy disk drive unless the ID data in ID card 6 corresponds to ID data stored on the floppy disk. While data, including ID data, on a floppy disk may be readily copied, the ID cards are not easily copied, especially if the cards include a customized security circuit. Since each ID card is embedded with a unique ID data code that corresponds to a unique ID data code stored in a floppy disk(s) having model game software program(s), a user may not read or write from or to a floppy disk having a model game program without a proper ID card.

When the console commands that data be read from the floppy disk, the file on the floppy disk from which the data is to be read is opened (452) and the ID data associated with that file is read (454). Similarly, if data is to be written to the floppy disk, then the file in a hard disk or game cartridge, or from a modem hook-up is opened and the ID data, if any, associated with that file is read. If the ID data of the opened file indicates the file is a new file (456), such as a file from a floppy disk purchased from the market, then the unique ID DATA from the user's ID card is read from the card (458) and written (460) to the ID DATA field over the new file data, automatically. In this way, the model game program and the user's program modifications to the model game program are stored with the user's ID DATA. Other users cannot use and copy these files. If a write error occurs (462) in placing the ID DATA onto the floppy disk, then the ID DATA write step is repeated (464) before an error message is displayed (466) to the user. Assuming that the ID DATA is successfully written to the floppy disk in connection with the new file, then the file is transferred (468) and the file is closed (470) to end (472) a write operation to the floppy disk.

If the file is not a new file (456), the ID file for that file (either on the floppy disk, on an on-console memory such as a hard disk or downloaded from a modem) is read to determine if the file has an associated proprietary ID DATA or a free ID DATA corresponding to a free file (474) that may be freely copied. Free files may be exchanged between users by swapping floppy disks or by modem. Free files will generally be data files for new games created from a particular model program that the creator of the new game has chosen not to copy protect. In such an instance, the data file for the new game can be copied so that other users may play the game or further revise the game, provided that those users have access rights to the necessary model game software. Accordingly, only user data, such as data created by a user to play a game derived from a model game program, may be freely transferred (468) from or to a floppy disk. If the free file is not user data (476), a caution is displayed to the user (478) and the file is closed (470) to prevent copying of the file.

If the file is not a new or free file (456, 474), then the file is assumed to have associated proprietary ID DATA. The user's ID DATA is read from a memory device in the user's ID card 6, inserted in the console (480) and the user's ID DATA is compared (480) to the ID DATA associated with the file to be written or read from or to the floppy disk. If the ID DATA compare successfully (482), then the file is written or read (468) to or from the floppy disk. If the comparison is unsuccessful, then an error message is displayed (484) to the user.

Figure 11:
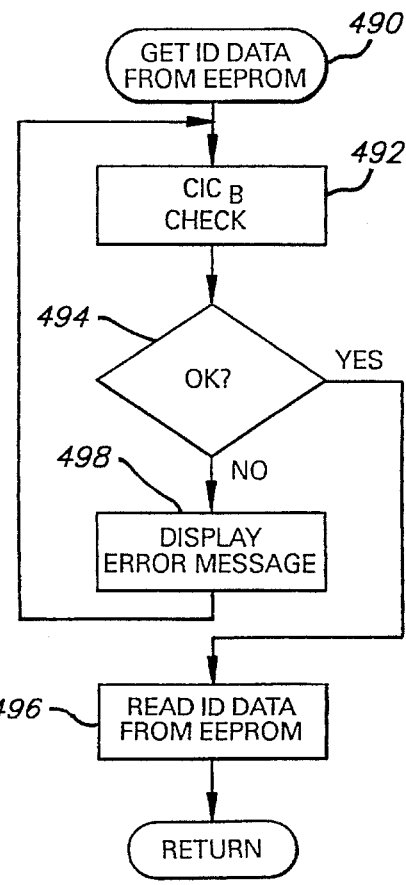

FIG. 11 is a flowchart showing the operation of obtaining ID DATA from a memory device, such as an EEPROM, of a user's ID DATA. When the ID DATA is to be obtained from a user's ID card (490), the security circuits in the ID card and ID card interface authenticate one another (492). Because these circuits may be customized integrated circuits, the danger that an unauthorized user has an ID card with an unauthorized circuit is relatively low. Once the security circuits authenticate one another (494), the ID DATA from the ID card is read from the card's memory (496) and if the circuits do not authenticate each other an error message is displayed to the user and no data is transferred from or to the floppy disk (498).

Figure 12:
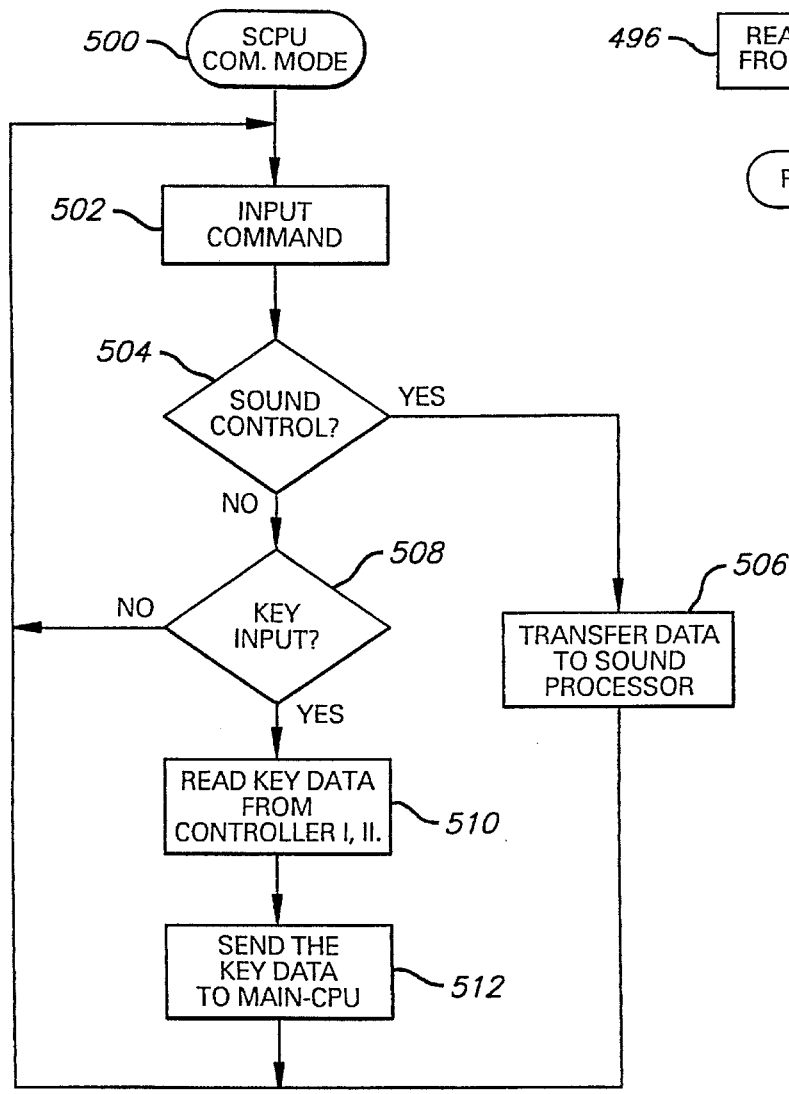

FIG. 12 is a flowchart showing the operation of inhibiting the game-CPU from functioning to play a game when there is no authentic cartridge in the console. As described above, an authentic cartridge, such as one having a proper security circuit, is necessary for a user to play a game with the console. If there is no authentic cartridge, a user with a proper ID card may operate the main-CPU and console in a manner similar to that of a conventional personal computer.

The program routine shown in FIG. 12 relates to a few minimum functions that the game-CPU performs while the console is restricted to its personal computer mode. While the console is in this mode, the game-CPU is generally inhibited. However, there are a few functions such as processing hand controller key signals, that the game processor still performs. These functions are needed for game editing and, thus, the game-CPU performs these functions even though it is inhibited.

When the game-CPU is in its inhibited mode (500), it remains inhibited until is receives (502) a command signal from an input device, such as a keypad hand controller. It is noted that certain known security circuits inhibit game-processors by holding the processor in a continual reset state. If such security circuits are to be employed here, provision must be made to release the reset state or to otherwise permit the game-CPU to operate. To process an input command, the game-CPU first determines whether the command relates to sound control (504) and, if so, transfers the command data to a sound processor (506).

If the command signal is not for sound control, then the game-CPU determines whether the signal pertains to a key input (508) from a controller, such as a hand-held keypad 12, 14. If the signal is neither related to sound control or a key input, the game-processor does not further process the command signal and returns to its inhibit state. If the command signal is a key input, then the key data is read from the appropriate controller (510) and the data is sent (512) to the main-CPU via the gate array for action. Thus, the game-CPU does not allow game functions to be performed in response to key inputs.

Figure 13:
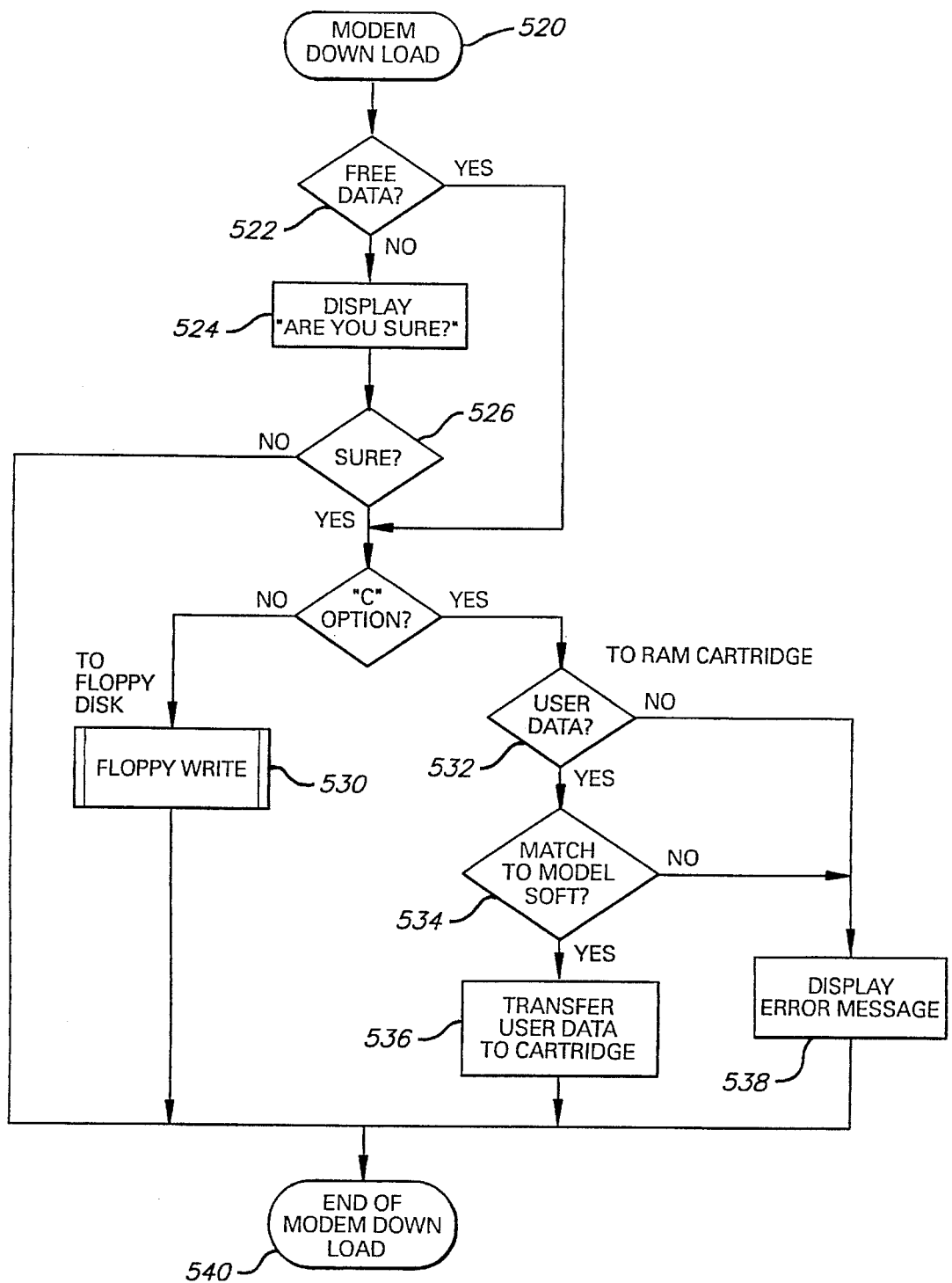

FIG. 13 is a flowchart showing an exemplary routine for transferring data/programs from a remote location to a game processor console. A user may connect remotely to a central depository of game programs, such as a game process center 40 (FIG. 5), or a game processor unit at a friend's house 50. During such a connection, the user might download a data or program file into his game processor by executing a routine (520). Just prior to downloading the file, the main-CPU receives the ID DATA associated with the file and determines whether the data may be loaded without charge to the user (522). If there is a charge associated with the file, then the user is prompted (524) by a screen display to confirm (526) that the file is to be downloaded. If a charge is associated with the downloading of a copy of the file, then the user will be billed for copying the file, such as automatically by debiting an account for the user maintained at the game process center and mailing an invoice to the user. When the file is ready to be downloaded, the user is prompted by the game processor to select (528) whether the file is to be copied to the floppy disk 6 or game cartridge 4. If the file is to be copied to a floppy disk (530), then a routine, such as described in connection with FIG. 10, is executed to verify that the user is authorized to copy the file to a floppy disk.

If the file is to be copied to a game cartridge, then the main-CPU confirms that the file is user data (532), such as data for a new game derived from a model game program. In addition, the user data to be loaded into the cartridge must match (534) the model software program already loaded in the game cartridge before the user data is copied to the game cartridge (536). An error message is displayed to the user, if the file to be downloaded is not user data or does not match a preloaded model game program (538). Upon completion of the download routine, the routine is completed and control of the main-CPU program is returned (540).

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method for restricting the playing and copying of video games to authorized users, wherein users have access to interactive computer systems having a display screen, an identification device interface, a removable disk drive and a game cartridge interface, comprising the following steps:

a. initially inhibiting the computer systems from copying or editing game program files;

b. reading an identification code stored on an identification device inserted into the identification device interface of one of said computer systems;

c. comparing the identification code read from the identification device to an identification code read from a game program file stored on a removable disk inserted in the removable disk drive of the computer system receiving the identification device in step (b);

d. if a predetermined relationship exists between the identification codes read from the identification device and from the game program file stored on the removable disk, enabling the computer system receiving the identification device in step (b) to copy and edit the game program file;

e. editing the game program file to create an edited game program derived from the game program file;

f. authenticating a game cartridge inserted in the game cartridge interface of the computer system receiving the identification device in step (b) and, if the game cartridge is authentic, copying at least a portion of the edited game program to the game cartridge; and g. playing the edited game program stored on the authenticated game cartridge on any of the computer systems, regardless of whether the computer system receiving the authenticated game cartridge is enabled to copy and edit the game program file in step (d).

2. A method for restricting the play and copying of video games as in claim 1 further comprising step (h) of inhibiting the playing of game program if the game cartridge is not authenticated in step (f).

3. A method for restricting the playing and copying of video games as in claim 2 wherein step (b) further includes authenticating the identification device through the execution of security programs executed by matching security circuits in the identification device and identification device interface.

4. A method for restricting the play and copying of video games to authorized users of an interactive computer system having a display screen, an identification device interface, a removable disk drive and a game cartridge interface, comprising the following steps:

a. reading an identification code stored on an identification device inserted into the identification device interface;

b. comparing the identification code read from the identification device to an identification code read from a related game program file stored on a removable disk inserted in the removable disk drive;

c. enabling the computer system to copy the game program file, if a predetermined relationship exists between the identification codes read from the identification device and from the related game program filed stored on the removable disk;

d. editing the game program file to create an edited game program derived from the game program file;

e. authenticating a game cartridge inserted in the game cartridge interface and, if the game cartridge is authentic, copying at least a portion of the edited game program to the game cartridge;

f. playing the edited game program stored on the game cartridge; and g. inhibiting the editing of the game program file in step (d) if the identification codes do not match in step (c) while permitting game play if the game cartridge is authenticated in step (e).

5. A videographics program editing system for use in editing and playing new interactive videographics programs for generating displays on a display screen having a computer comprising:

a first processor operable to execute a videographics program stored in a program cartridge, said first processor being inhibited from executing a videographics program until the program cartridge is authenticated by a security circuit associated with the first processor;

a second processor operable to edit the videographics program to be stored in the first processor, said second processor being inhibited from generating displays until an authentic ID card is inserted in the program editing system.

6. A videographics program editing system as is in claim 5 wherein said second processor matches an ID code associated with data and program files stored on an external disk with an ID code stored in the ID card before copying the files.

7. A videographics program editing system as in claim 5 wherein said first processor is operable to execute the videographics program stored in the game cartridge regardless whether the second processor is inhibited from generating displays.

8. A videographics program editing system as in claim 5 wherein said first processor communicates with said second processor.

9. A videographics program editing system for use in editing and playing new interactive videographics programs for generating displays on a display screen comprising:

a first processor operable to execute a videographics program stored in a program cartridge, said first processor being inhibited from executing a videographics program until the program cartridge is authenticated by a security circuit associated with the first processor;

a second processor operable to edit the videographics program to be stored in the first processor, said second processor being inhibited from generating displays until an authentic ID card is inserted in the program editing system, and wherein said first processor and said second processor communicate via a gate array.

10. A method for restricting the displaying and copying of videographics to authorized users of an interactive computer system having a display screen, an identification device interface, a memory drive device and a read only videographics program storage interface, comprising the following steps:

a. reading an identification code stored on an identification device inserted into the identification device interface;

b. comparing the identification code read from the identification device to an identification code read from a related videographics program file stored on a memory unit inserted in the memory drive device;

c. if a predetermined relationship exists between the identification codes stored in the identification device and memory unit, enabling the computer system to copy the videographics program file, d. editing the videographics program file to create an edited videographics program derived from the videographics program file;

e. authenticating a videographics program storage device inserted in the videographics program storage interface and, if the videographics storage device is authentic, copying at least a portion of the edited videographics program to the videographics storage device, and f. executing the portion of the edited videographics program stored in the videographics storage device to display videographics generated by the edited videographics program, regardless of whether a predetermined relationship was found to exist in step (c).

11. A method for restricting the displaying and copying of videographics as in claim 10 further comprising step (g) of inhibiting the displaying of the videographics if the videographics storage device is not authenticated in step (e).

12. A method for restricting the displaying and copying of videographics as in claim 10 wherein step (a) further includes authenticating the identification device through the execution of security programs executed by matching security circuits in the identification device and identification device interface.

13. A method for restricting the displaying and copying of video games to authorized users of a computer system having a display screen, an identification device interface, a memory drive device and a read only videographics program storage interface, comprising the following steps:

a. reading an identification code stored on an identification device inserted into the identification device interface;

b. comparing the identification code read from the identification device to an identification code read from a related videographics program file stored on a memory unit inserted in the memory drive device;

c. if a predetermined relationship exists between the identification codes stored in the identification device and memory unit, enabling the computer system to copy the videographics program file, and d. editing the videographics program file to create a videographics program derived from the videographics program file, e. authenticating a read only videographics program storage device inserted in the videographics program storage interface and, if the videographics storage device is authentic, copying at least a portion of the videographics to the videographics storage device, f. displaying the videographics, and g. inhibiting the editing of videographics in step (d) if the identification codes do not match in step (c) while permitting the display of videographics if the videographics storage device is authenticated in step (e).

14. A videographics computer for editing, copying and displaying videographics on a display comprising:

a. a first processor for editing and copying a videographics program stored on a removable disk inserted into a removable disk drive operatively coupled to said first processor;

b. an ID-card interface for inhibiting said first processor from editing or copying the program stored on the removable disk until an ID-card having an ID-code matching an ID-code associated with the program is inserted in said interface and the ID-card;

c. a second processor for executing the videographics program and generating videographics display signals, and incapable of editing or copying the program, and d. a housing containing the first and second processors.

15. A videographics computer system as in claim 14 wherein said first processor copies the program to memory unit, and said second processor executes the program by reading the program from the memory unit.

16. A videographics computer system as in claim 15 wherein said memory unit includes an authentication circuit that is authenticated by a corresponding authentication unit associated with said second processor, and said second processors executes programs only after the memory unit is authenticated.

17. A videographics computer system as in claim 16 wherein the memory unit is a cartridge.

18. A videographics computer system as in claim 14 wherein the videographics program is a video game program.

19. A videographics program editing system for use in editing and playing new interactive videographics programs for generating displays on a display screen having a computer comprising:

a first processor operable to execute a videographics program stored in a program cartridge, said first processor being inhibited from executing a videographics program until the program cartridge is authenticated by a security circuit associated with the first processor;

a second processor operable to edit the videographics program to be stored in the first processor, said second processor being inhibited from generating displays from the execution of the videographics program until an authentic ID card is inserted in the program editing system.

20. A videographics program editing system as is in claim 19 wherein said second processor matches an ID code associated with data and program files stored on an external disk with an ID code stored in the ID card before copying the files.

21. A videographics program editing system as in claim 19 wherein said first processor is operable to execute the videographics program stored in the game cartridge regardless of whether the second processor is inhibited from generating displays.

22. A videographics program editing system as in claim 19 wherein said first processor communicates with said second processor.

23. A videographics program editing system as in claim 22 wherein said processors communicate via a gate array.

24. A videographics program editing system for use in editing and playing new interactive videographics programs for generating displays on a display screen having a computer comprising:

a first processor operable to execute a videographics program stored in a program cartridge, said first processor being inhibited from executing a videographics program until the program cartridge is authenticated by a security circuit associated with the first processor;

a second processor operable to edit the videographics program to be stored in the first processor, said second processor being inhibited from executing the videographics program until an authentic ID card is inserted in the program editing system.

25. A videographics program editing system as is in claim 24 wherein said second processor matches an ID code associated with data and program files stored on an external disk with an ID code stored in the ID card before copying the files.

26. A videographics program editing system as in claim 24 wherein said first processor is operable to execute the videographics program stored in the game cartridge regardless of whether the second processor is inhibited from generating displays.

27. A videographics program editing system as in claim 24 wherein said first processor communicates with said second processor.

28. A videographics program editing system as in claim 27 wherein said processors communicate via a gate array.

\* \* \* \* \*